US010972436B1

(12) United States Patent
Simanel et al.

(10) Patent No.: US 10,972,436 B1
(45) Date of Patent: Apr. 6, 2021

(54) SYSTEM AND METHOD FOR SESSION AFFINITY IN PROXY MEDIA ROUTING

(71) Applicant: 360 IT, UAB, Vilnius (LT)

(72) Inventors: Darius Simanel, Vilnius (LT); Mantas Jonytis, Grigiskes (LT)

(73) Assignee: 360 IT, UAB, Vilnius (LT)

( * ) Notice: Subject to any disclaimer, the term of this patent is extended or adjusted under 35 U.S.C. 154(b) by 0 days.

(21) Appl. No.: 17/079,450

(22) Filed: Oct. 24, 2020

(51) Int. Cl.
*H04L 29/06* (2006.01)
*H04L 29/08* (2006.01)

(52) U.S. Cl.
CPC ...... *H04L 63/0281* (2013.01); *H04L 63/0272* (2013.01); *H04L 67/145* (2013.01); *H04L 67/146* (2013.01)

(58) Field of Classification Search
CPC .................................................. H04L 63/0281
USPC ........................................................ 726/12
See application file for complete search history.

(56) References Cited

U.S. PATENT DOCUMENTS

| | | | | |
|---|---|---|---|---|
| 6,266,704 B1* | 7/2001 | Reed | ...................... | H04L 45/00 709/238 |
| 8,874,771 B2* | 10/2014 | Munger | .............. | H04L 61/2092 709/230 |
| 10,810,571 B2* | 10/2020 | Todasco | ............. | G06Q 20/3224 |
| 2010/0325419 A1* | 12/2010 | Kanekar | ............. | H04L 63/0471 713/151 |
| 2014/0165177 A1* | 6/2014 | Alagha | ............... | H04L 63/0272 726/9 |
| 2014/0223575 A1* | 8/2014 | Nandi | .................. | H04L 67/306 726/27 |
| 2015/0067819 A1* | 3/2015 | Shribman | ............... | H04L 67/06 726/12 |
| 2016/0292694 A1* | 10/2016 | Goldschlag | ......... | H04L 63/0272 |
| 2016/0330097 A1* | 11/2016 | Kim | ..................... | H04L 43/0864 |
| 2016/0373372 A1* | 12/2016 | Gillon | ..................... | H04L 69/14 |
| 2017/0012988 A1* | 1/2017 | Turgeman | ............. | H04L 47/283 |
| 2017/0337813 A1* | 11/2017 | Taylor | .................. | G05D 1/0287 |
| 2018/0167404 A1* | 6/2018 | Machlica | ................ | H04L 43/16 |
| 2018/0225230 A1* | 8/2018 | Litichever | ............... | G06F 21/82 |
| 2018/0295134 A1* | 10/2018 | Gupta | ..................... | H04L 67/28 |
| 2019/0081930 A1* | 3/2019 | Hunt, IV | ............. | H04L 63/0414 |
| 2019/0320047 A1* | 10/2019 | Jeuk | ......................... | H04L 45/38 |
| 2019/0327086 A1* | 10/2019 | Slowik | .................. | H04L 9/3247 |
| 2020/0134141 A1* | 4/2020 | Ford | ....................... | G06F 21/44 |
| 2020/0204551 A1* | 6/2020 | Singh | .................. | H04L 67/1002 |
| 2020/0358858 A1* | 11/2020 | Shribman | ............... | G06F 9/547 |

(Continued)

OTHER PUBLICATIONS

Dingledine et al., "Tor: The Second-Generation Onion Router", 2004 (Year: 2004).*

(Continued)

*Primary Examiner* — Ondrej C Vostal
(74) *Attorney, Agent, or Firm* — Praveer Gupta

(57) ABSTRACT

A system and method of relaying all requests of a session through a single exit node or proxy server is provided. The method comprises several steps, such as relaying a request through a dedicated proxy media streaming server, hashing session identifier value and transmitting it across different protocols. The system assigns a unique identifier to a session. The unique identifier is inserted in various protocols and communicated to a proxy server provider. All subsequent requests are serviced through the same last-mile proxy server or exit node.

20 Claims, 8 Drawing Sheets

(56) References Cited

U.S. PATENT DOCUMENTS

2020/0380170 A1* 12/2020 Bennett .............. G06F 21/6245
2020/0382420 A1* 12/2020 Suryanarayana ..... H04L 69/164

OTHER PUBLICATIONS

Goldschlag et al., "Onion Routing for Anonymous and Private Internet Connections", 1999 (Year: 1999).*
Onion-Routing.net, "Onion Routing Network Requirements Document", 1996 (Year: 1996).*
Reed et al., "Anonymous Connections and Onion Routing", 1998 (Year: 1998).*

* cited by examiner

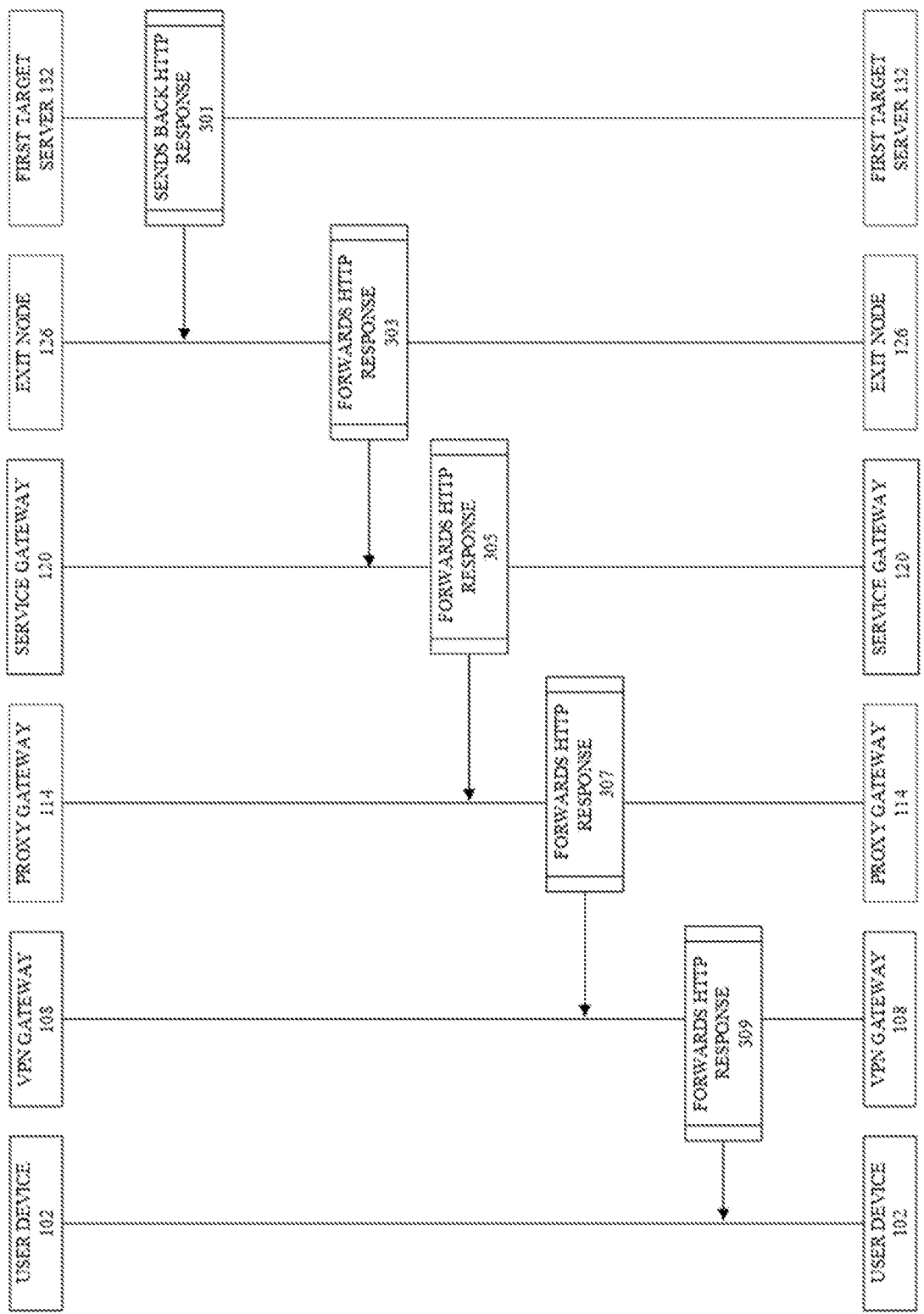

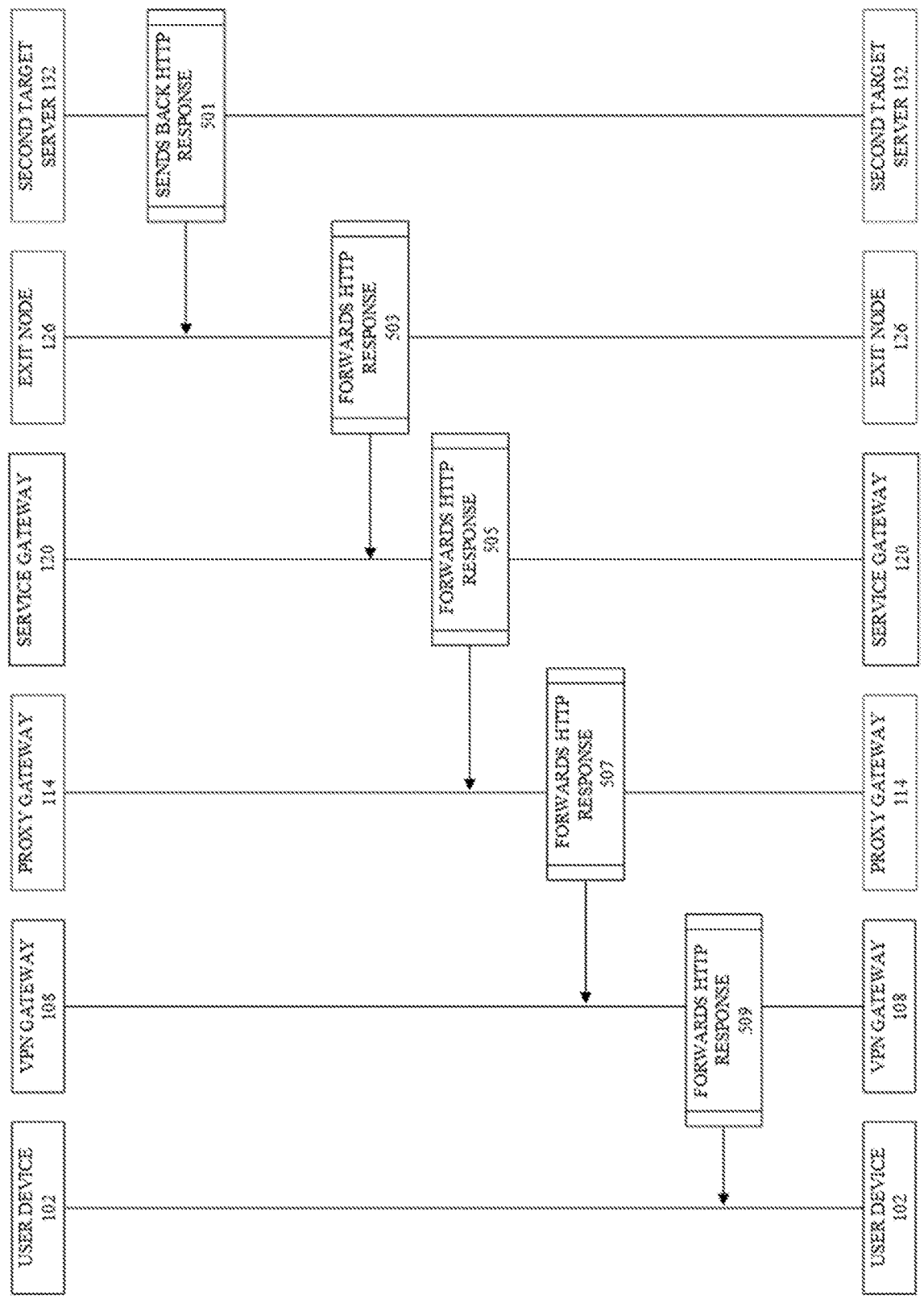

SYSTEM AND METHOD FOR SESSION AFFINITY IN PROXY MEDIA ROUTING

FIELD

The disclosure belongs to the area of media streaming and virtual private network (VPN) technology. More specifically, the disclosures present an efficient way to stabilize a VPN connection by ensuring that all of the user's device requests during a session are serviced by the same proxy server or exit node.

BACKGROUND

Media can be distributed on the internet in one of three ways: full download, progressive download, and streaming. Full download has the disadvantage of having to wait until the download is complete to view the media. It is only usable for non-real-time media. Progressive download is applied to the parts of the media progressively, so the user can begin viewing the media before it is fully downloaded. Progressive download is another method for non-real-time media distribution because a significant pre-load is usually required to begin viewing the media. Streaming, conversely, is real-time media distribution. It works by filling out a playout buffer at the client (usually a few seconds) and playing from the buffer as soon as it fills up. The advantage of streaming is almost instantaneous distribution of the media content.

However, streaming is extremely susceptible to network impairments, like packet loss and jitters. More specifically, if the rate of transmission of the media is lower than the playback rate, the playback buffer runs out and the media freezes until the buffer is filled out again.

Media streaming companies strive to offer uninterrupted experience to its users. They want playback to start instantly and to never stop unexpectedly in any network environment. One way to do that is to reduce the buffer size by compressing the media in more efficient ways. The other way is to ensure that the connection is stable and reliable and the servers can handle the load.

A key issue in media streaming is connection reliability. Reliability, formally speaking, is the ability of a connection to function under stated conditions for a period of time. Put simply, reliability means a connection should work and continue to work in a way that supports continuous streaming of the media.

A streaming service can decide to differentiate the service quality or content based on the geolocation of its users. For example, it can decide to reduce the quality of its services to reduce load on its servers or the ISPs in a certain region.

Media streaming companies include video and audio services, online gaming and gambling platforms and other services that require transferring high volumes of media content quickly. Online games are basically video games that are either partially or primarily played by streaming contents through the internet or any other available computer network. The design of online games can range from simple text-based environments to the incorporation of complex graphics and virtual realities. In recent days, gaming industries provide high quality standards, even reaching Ultra HD levels. The situation is very similar, in case of online gambling as well, where quality contents are streamed and accessed from all over the world.

However, online gaming and gambling industries do have their own set of challenges in providing quality content constantly without lag in user experience. Since online gaming websites are accessed by high numbers of users at the same time and their file sizes are big, online gaming providers face challenges in tackling the bottleneck situations and providing gaming downloads at optimal speed.

Lagging even for a second can be a great disadvantage to online gaming and gambling websites. Maintaining optimal speed and minimizing the lag in content delivery are two key challenges for online gaming and gambling providers. The quality and the content size of these websites is constantly increasing, so distributing their media to numerous users can be a challenge. For better handling of these problems, online gaming and gambling providers tend to use Content Delivery Networks (CDN) to improve latency and user experience.

VPN stands for Virtual Private Network (VPN), a technology that allows a network entity to connect to a private network over a public network. Traditionally the main function of VPN has been to allow for a roaming client, or a distant office connected to a public network, to connect to a private network for accessing the resources within e.g. business applications within a corporate LAN.

VPN technology was developed to allow remote users and branch offices to access corporate applications and resources. To ensure security, the private network connection is established using an encrypted layered tunneling protocol and VPN users use authentication methods, including passwords or certificates, to gain access to the VPN. In other applications, Internet users may secure their connections with a VPN, to circumvent geo-restrictions and censorship, or to connect to proxy servers to protect personal identity and location to stay anonymous on the Internet.

VPN customers generally use TCP for connection to resources on the Internet while connected to the VPN service provider. As a standard during the connection, a single end-to-end TCP link is established over the VPN tunnel from the VPN customer to the target resource on the Internet. The endpoints of this TCP connection negotiate, or inform each other of, the set of network capability thresholds available to them, through the use of optional parameters defined within the packets. When communicated during the established connection, these parameters will drive the functionality of the protocol, helping effectively manage the bandwidth available, and mitigate any negative factors interfering with the flow of data e.g. latency, congestion and packet loss.

A VPN server, to which a user connects, relays the user's requests through proxy servers. Proxy servers can perform several functions to increase data security and network performance, including acting as a firewall and web filter, providing shared network connections, and cache data to speed up common requests. Proxy servers can provide a high level of privacy. Proxy servers can change the IP address and other identifying information the web request contains (e.g., so that the destination server does not know who made the original request). Proxy servers can also be used to control internet usage of employees and children (e.g., organizations and parents can set up proxy servers to control and monitor how their employees or kids use the Internet) or improve browsing speeds and save bandwidth (e.g., proxy servers can cache, i.e. save a copy of the appropriate website data locally and when the requested content is available locally, the original request is served from the local copy).

Proxies can be used to bypass certain Internet restrictions (e.g. firewalls) by enabling a user to request content through a (remote) proxy server instead of accessing the content directly. Proxy servers are often used to get around geo-IP based content restrictions. If someone wants to get content from a United States (US) webpage that they are not allowed to access from their home country, the request can go through a proxy server that is located in the US, thus operating from a US IP address space. Using proxy services, the user's traffic seems to be coming from the US IP address.

A proxy server (a computer system or an application) connection by a client acts as an intermediary for requests from clients seeking resources from other servers. A client connects to the proxy server, requesting some service, such as a file, a connection, a web page, or other resources available from a different server. The proxy server evaluates the request for content and forwards the request to the actual target system or systems containing the corresponding content. After obtaining the content, the proxy server normally forwards the content to the original requestor, but other actions can also be performed by the proxy (e.g., return error message, etc.). Depending on the type of request, a proxy server may or may not have full visibility into the actual content fetched to the original requestor, e.g., in case of an encrypted Hypertext Transfer Protocol Secure (HTTPS) session, the proxy may serve as an intermediary, blindly forwarding the data without being aware of what is being forwarded.

The proxies can be divided into different types depending on what functions are provided or what servers are used. The proxies can also be divided into Residential Internet Protocol (IP) proxies, Datacenter IP proxies, and Mobile IP proxies. A Residential IP address is an address from the range specifically designated by the owning party as assigned to private customers. Usually a Residential proxy is an IP address linked to a physical device, for example, mobile phone or desktop computer, however businesswise the blocks of Residential IP addresses may be bought from the owning Proxy Service Provider by another company directly, in bulk. The real owners of the Residential IP address ranges, namely Internet service providers (ISPs), register residential IP addresses in public databases, which allows websites to determine a device's internet provider, network, and location. Datacenter IP proxy is the proxy server assigned with a datacenter IP. Datacenter IPs are IPs owned by companies, not by individuals. The datacenter proxies are actually IP addresses that are not located in a natural person's home. Instead, the datacenter proxies are associated with a secondary corporation. Mobile IP proxies may be considered a subset of the Residential proxy category. A mobile IP proxy is essentially one IP address that is obtained from mobile operators. Mobile IP proxies use mobile data, as opposed to a residential proxy that uses broadband ISPs or home Wi-Fi. A proxy server is basically a computer on the internet with its own IP address that the client's computer knows. When a client sends a web request, the request goes to the proxy server first. The proxy server then makes the web request on the client's behalf, collects the response from the web server, and forwards the web page data so that the client can see the page in the browser. When the proxy server forwards the web requests, the proxy server can make changes to the data but yet provide the data requested. A proxy server changes the client's IP address, so the web server is not provided the geographical location of the client. A proxy can encrypt the client's data so that the client's data becomes unreadable in transit. Also, a proxy server can block access to certain web pages, based on IP address, domain name, or the communication protocol parameters, such as the port requested.

Exit node proxies, or simply exit nodes, are gateways where encrypted traffic hits the Internet, or are proxies, and through these proxies the request from the user (or the entry node) reaches the Internet. There can be several proxies used to perform a user's request, but exit node proxy is the final proxy that contacts the target and forwards the information from the target to the queue to reach the user. There can be several proxies serving the user's request, forming a proxy chain, passing the request through each proxy in the linear sequence, with the exit node being the last link in the chain that ultimately passes the request to the Target, as well as transfers the reply back to the User through the original chain of proxies.

Normally, users access information online through human readable domain names. However, web browsers interact only through Internet protocol (IP) addresses. DNS facilitates in translating or in other words resolving the domain names into numerical IP addresses so that web browsers can direct the user to the targeted internet resources.

DNS is an acronym for Domain Name Services and is a standard protocol enabling the internet user to be directed to the target resource. Resolving domain names into numerical IP addresses is vital for locating and identifying target websites, servers, or devices along with underlying network protocols.

DNS resolving is carried out by a DNS resolver also known as a recursive resolver, which is a server designed to receive DNS queries from web browsers and other applications. A DNS query or a DNS request is a demand for information sent from a user's device to a DNS server, in most cases DNS request is sent in order to ask for the IP address associated with a domain name. The resolver receives the domain name and directs it to the root server and receives the details of Top-Level Domain name (TLD) server. Through the TLD name server, the root server receives the details of an authoritative name server and requests for IP addresses that match the desired domain name, the DNS query is resolved when it receives the requested IP address.

Nevertheless, DNS servers can be configured to redirect the user queries (requests) to a proxy server that represents the actual target server. This is done by replacing actual IP addresses of target servers for the IP addresses of the proxy server. These are usually carried out by proxy service providers to enhance their services and improve security. Apart from configuring the DNS servers, firewalls can also be used to reroute the user request and redirect them to a proxy server.

Exit nodes are the gateways that connect to the target website or service, like a media streaming service. However, big media streaming services cannot be efficiently placed on single servers. They rely on a much larger network of servers to maintain performance. They do this by building a Content Delivery Network (CDN).

CDNs take the original website and the media content it contains, and copy it across hundreds of servers spread all over the world. So, for example, when a user logs in from Egypt, instead of connecting to the main media streaming server in the United States it will load a copy of it from a CDN server that is the closest to Egypt. This greatly reduces latency. Latency is the time taken between a request and a response. CDNs are the tools to enable websites with a high number of users to load fast irrespective of where a user is.

For example, when a user begins to load the media, a streaming service can locate 10 closest servers that have the media loaded on them. The media streaming server can detect which one of them is the closest or works fastest on a user's internet connection, and then load media from there.

Another area where CDNs are greatly advantageous is online gaming. Users of online gaming websites continually expect fast downloads and streaming speeds in order to have the optimal experience. Considering many games are played on 4K or ultra HD with huge file sizes, it may be a constant challenge for online gaming providers to maintain the speed, quality, and connectivity. One of the main challenges to the gaming industry is the chance of lagging for players during a game play because even a one-second lag in an online gaming experience could ruin user experience. Connectivity has become a major issue for outlying geographical areas.

To tackle these challenges, companies that provide online gaming have employed CDNs to deliver their content without lag in speed and performance. Using CDNs for gaming also means that their contents are distributed globally over numerous servers instead of one main server. This breaks the bottleneck situation and allows users from all over the world to access the gaming content from the server that is nearer to them geographically.

Using CDN also allows online gaming providers to scale up their companies. Since online games continue to become larger in scope as players demand sophisticated graphics and capabilities, CDN appears to be the best solution to provide these gaming contents to users all over the globe without delay and other difficulties.

Like online gaming, online gambling websites also provide a wide variety of gambling options to their users through constant live updates and streaming. These websites also rely highly on connectivity and speed of content delivery. Moreover, gambling users can be sensitive to ping time, the round time taken for the response to reach the end user. To avoid such situations gambling service providers also tend to use CDN for improving user experience and to avoid lags. Distributing their contents over numerous servers across all geographical regions provides better user experience to online gamblers and easy access and reliability.

A significant challenge that VPN users face while accessing streaming, online gaming or gambling services through a proxy server is that these media services are often accessed on CDNs. This means that a user might connect to one server for authentication, another for media inventory search, and yet another for actual media streaming.

When a user passes from one server to another, their connection is recognized as a separate request. If this happens when a user is connected through a proxy service, a proxy management server identifies the separate requests and usually chooses to assign a new exit node for each distinct request, i.e. directing the user's requests through different IP addresses. A single user's traffic arriving from multiple IP addresses may trigger a restrictive user policy at the content owner's end and a streaming service provider can decide to log the user out or require to perform CAPTCHAs (Completely Automated Public Turing test to tell Computers and Humans Apart).

To avoid this, current embodiments allow to retain the same exit node for an entire user's session despite changes in domain names or IP addresses of the targets in the user's requests to the streaming service provider. The current embodiments also allow to retain this sticky quality of the session through protocol changes along the way, for example communicating proxy protocol parameters through web request parameters.

SUMMARY

One aspect of the current embodiment provides systems and methods to assign an exit node to the user's session in a media streaming service of any kind such as videos, films, music, gaming or gambling. This means that all requests sent by the user in a particular session are assigned and sent through the same exit node, thus avoiding the switching of exit nodes by the proxy service provider for each request in the same session of the user approaching a media streaming service through VPN service provider. In relation to the current embodiment, media is not limited to video streaming but may include online gaming and gambling as well.

For a VPN user, the current embodiment provides systems and methods to avoid the unnecessary switching of exit nodes, and consequently exit IP addresses visible to the target, within the same media streaming, gaming or gambling session. This is accomplished by first creating a unique hash ID string for the user's session. The hash ID is utilized as the value for the session identification string assigned to the user's media streaming session. The session identification parameter is recognized by the proxy provider of the last-mile proxy as the requirement to keep using the same exit node for the duration of the said streaming session. Consequently, the selected exit node is assigned strictly to that specific session for the whole duration of it, thereby creating a "sticky session". As long as the user is within the same VPN connection session, all requests changing their target server or domain are made through the same exit node utilizing the aforementioned sticky session.

The embodiments described herein firmly adhere to a policy of 'no-log' which means information related to user activity and identity are not logged or registered. The current embodiments do not compromise in providing privacy and security for the users. By enforcing a no-log policy, personal information of the user is not collected and stored. The session ID created by the current embodiment lasts as long as the session survives and moreover the values are hashed using a cryptographic algorithm. This allows the user to be completely anonymous on the network thereby providing complete privacy.

A logic unit present in the proxy media server infrastructure aids in translating the parameters of the proxy protocol, namely session identification into other protocols, including HTTP, which allows the proxy service providers to recognize the requirement for a session with a single exit node and correspondingly assign one exit node to all requests carrying the same session identification ID.

One unique feature of the current embodiment is that a logic unit plays a crucial role in translating the parameters of the proxy requests namely the session ID into other protocols that are recognized by an external proxy service provider e.g. by communicating the session identification through a HTTP header and other means to the party that does not support proxy protocol. The translation of the session identification aids in communicating the stickiness or affinity of the session to certain exit nodes that do not support proxy protocol natively.

Another feature of the current embodiment is the way that it can direct the user device's requests to the proxy media server which is an internal or external proxy to the VPN server that is dedicated to handling media streaming requests. The embodiment has the ability to employ either DNS-based redirection or network rerouting to relay the user device to the proxy media server. When asked to resolve the name of the target server, the inbuilt DNS server present within the VPN server containing a local representation of the target's DNS zone, resolves the target's hostname to the IP address of the proxy media server. As a result, the request originating at the user device will be directed to the proxy media server.

However, the current embodiment is not only limited to employ DNS-based redirection of requests, but can also employ network rerouting to reroute the user request and redirect them to the proxy media server. When the embodiment is set to employ network rerouting, the firewall is enabled to rewrite the IP addresses of the actual target servers into proxy IP addresses thereby redirecting the user request to the proxy media server. When network rerouting is employed in the current embodiment, the DNS resolving is untouched and the DNS server resolves and provides the actual IP address of the target media server. The firewall present is able to reroute requests to the proxy media server before accessing target servers. Therefore, the user device will be directed to the proxy media server present in the current embodiment.

The current embodiment also ensures that the session ID is generated in a way that ensures the unique session identification within the context of the same VPN server. In one exemplary embodiment, the generation of the session identification string comprises combining the local IP address of the VPN user assigned to the server end point of the user's VPN tunnel by the VPN server, and the external IP address of the VPN server. Since this combination is unique to a specific VPN server, in this way the current embodiment can generate a unique session identification string for each session that has the corresponding requirement. Therefore, a streaming, gaming or gambling session of a VPN user can be distinguished and maintained across multiple cooperating proxy providers and their proxy servers, up to the last mile exit node, and the same exit node can be assigned to it, thereby creating a sticky session.

DESCRIPTION OF DIAGRAMS

FIG. 3 an exemplary flow diagram of returning first response.

Figure 4A:
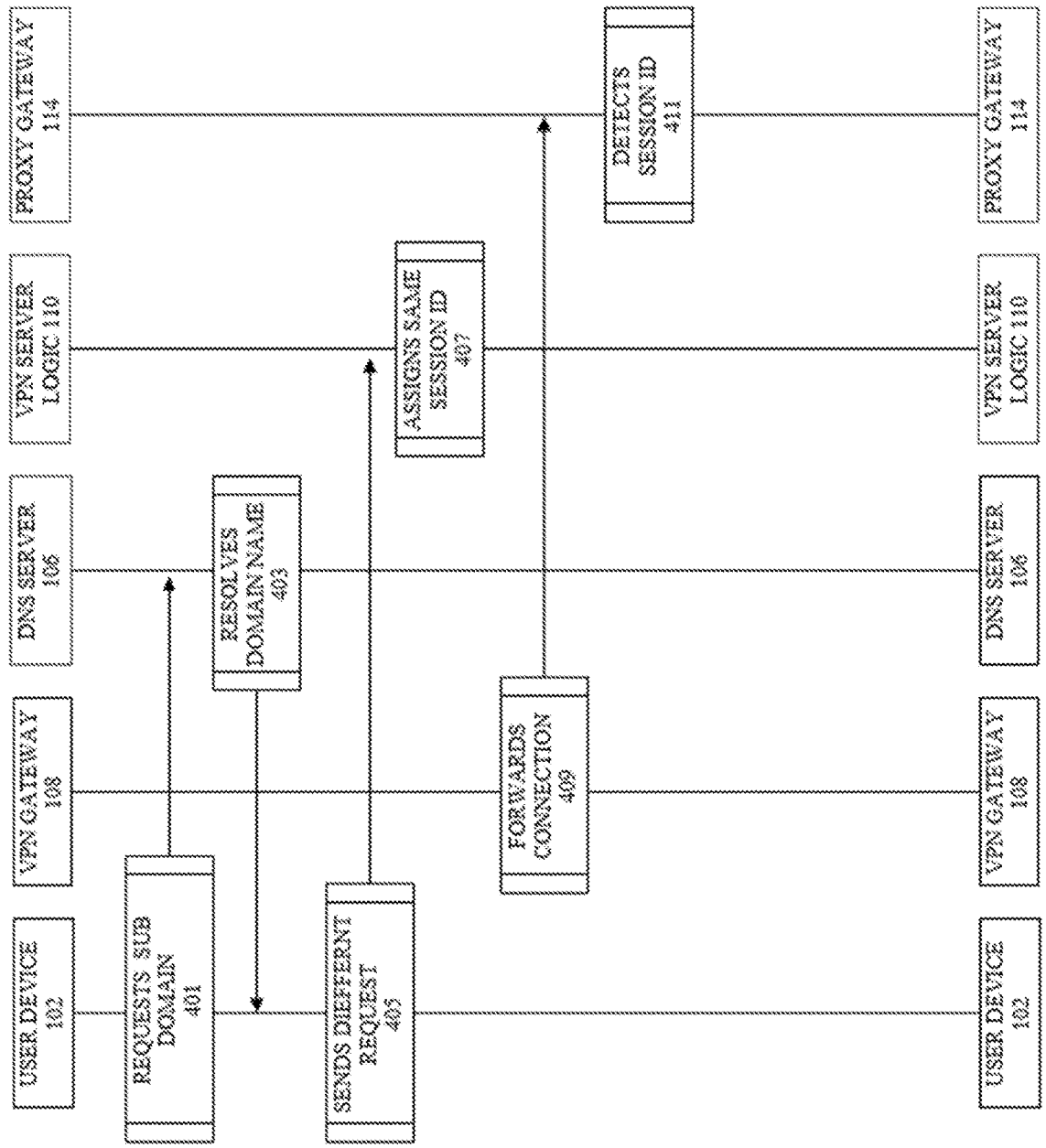

FIG. 4A shows an exemplary flow diagram of making a second request during the same sticky session.

Figure 4B:
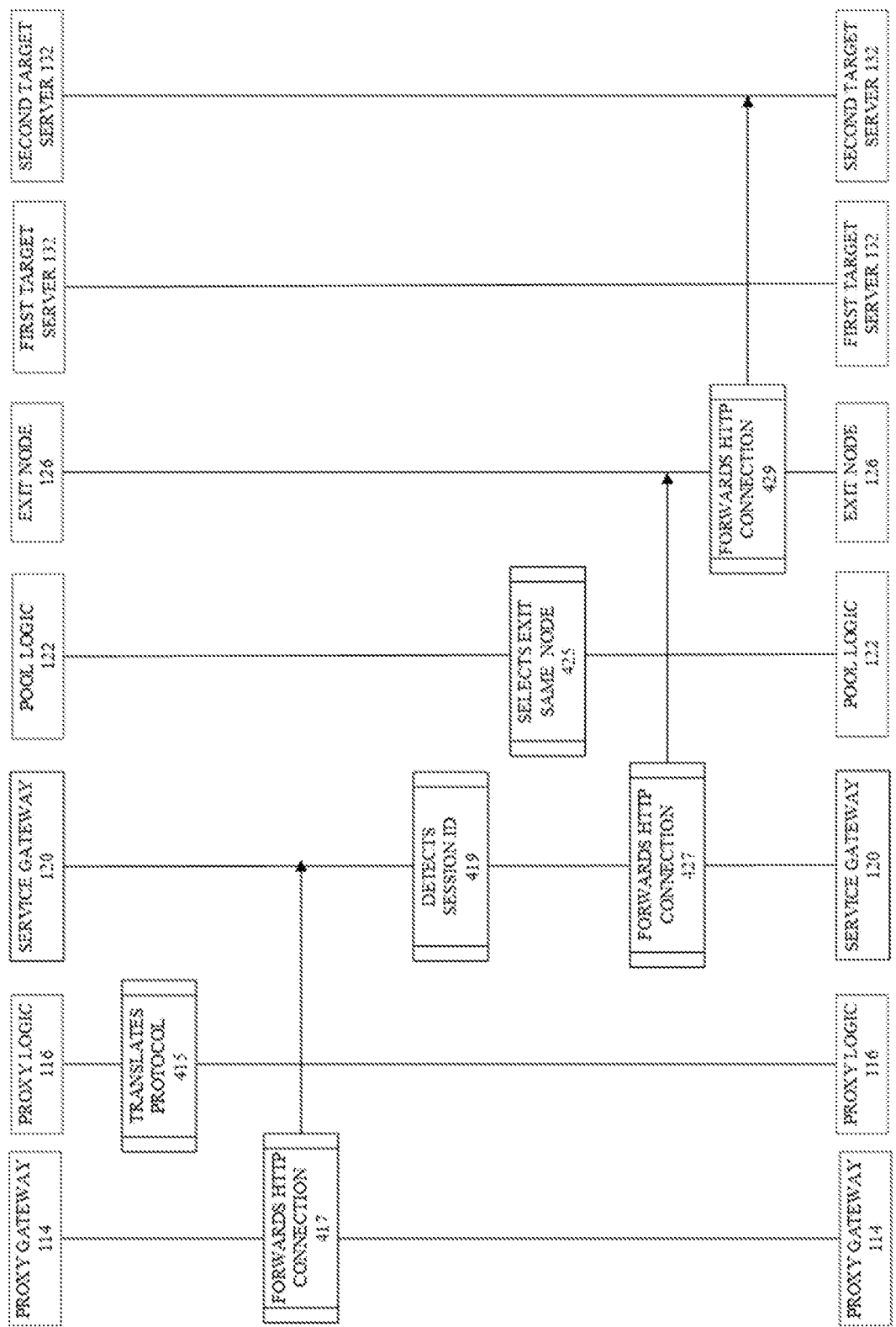

FIG. 4B shows the continuation of the exemplary flow diagram of making a second request during the same sticky session.

FIG. 5 shows an exemplary flow diagram of returning second response.

Figure 6:
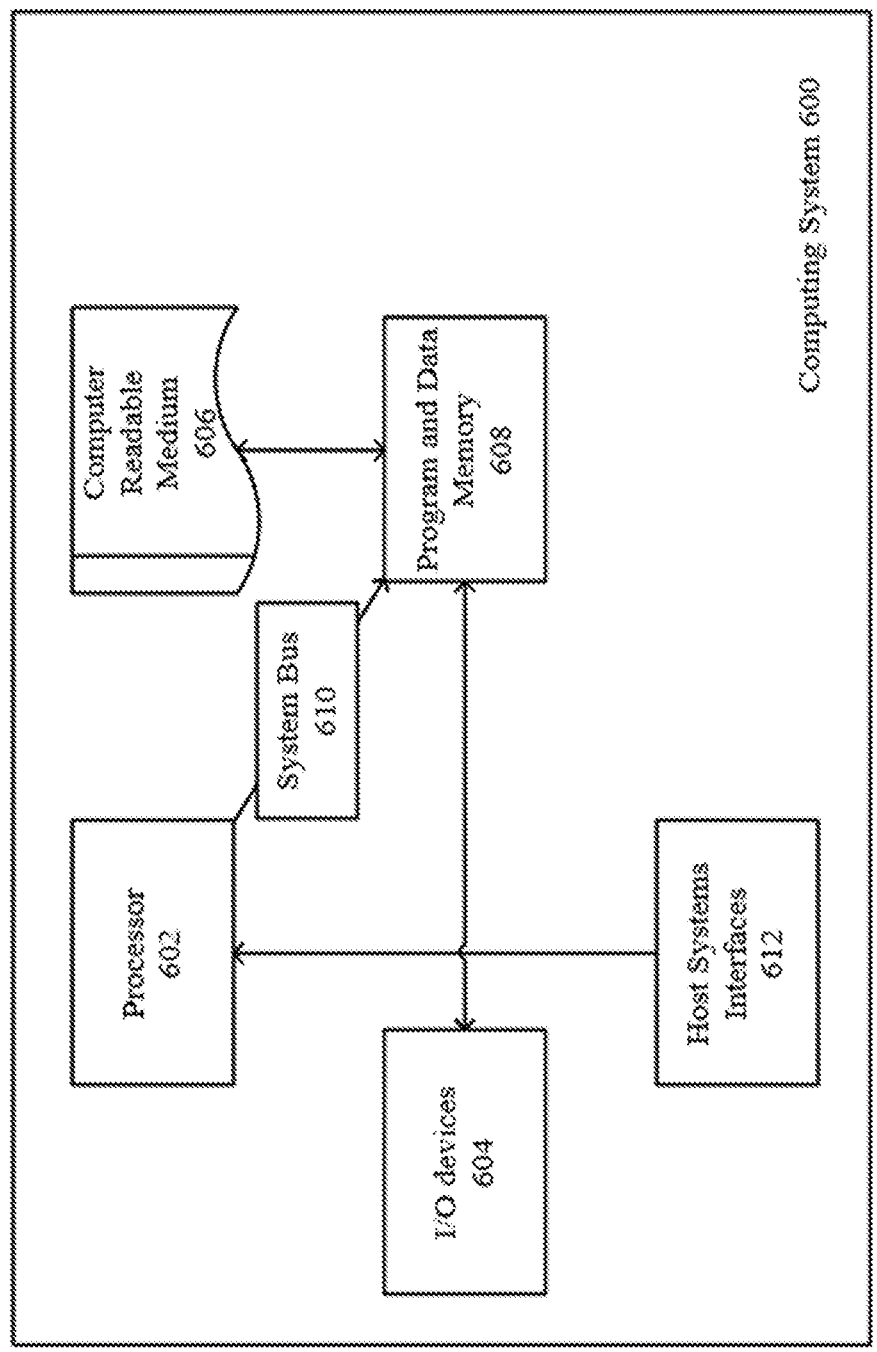

FIG. 6 shows a computing system in which a computer readable medium may provide instructions for performing any of the methods and processes disclosed herein.

DETAILED DESCRIPTION

Some general terminology descriptions may be helpful and are included herein for convenience and are intended to be interpreted in the broadest possible interpretation. Elements that are not imperatively defined in the description and should have the meaning as would be understood by the person skilled in the art.

User Device 102—can be any computing device where a person installs and executes the application that delivers VPN connectivity. It can include any physical device that is connected to a network, including, for example, a laptop, a mobile phone, a tablet computer, a desktop computer, or any other smart device, also routers and other network devices. User Device 102 can also be a device, which is capable of network connectivity, but not primarily intended for networking, such as connected home appliances, smart home security systems, autonomous farming equipment, wearable health monitors, smart factory equipment, wireless inventory trackers, biometric cybersecurity scanners, shipping containers, and others.

VPN Server 104—a physical server that is configured to host and deliver VPN services to any number of User Device 102. The VPN Server 104 is a combination of hardware and software that allow User Device 102 to connect to a secure private network. The VPN server consists of VPN Server logic 110, VPN Gateway 108, and its own DNS Server 106. In some embodiments, VPN Server logic 110 and VPN Gateway 108 can be combined into a single hardware or software unit. Also, in some embodiments, DNS Server 106 can be missing from the VPN Server 104.

DNS Server 106—a constituent of the VPN Server that provides translation of domain names to the respective IP addresses. DNS Server 106 is a combination of hardware and software that enables it to resolve domain requests made by User Device 102. It uses a standard protocol that is responsible for providing the IP addresses for domains requested by User Device 102. It can also be a separate physical server or on a cloud containing lists of IP addresses.

VPN Gateway 108—a computing device and a constituent of VPN Server 104. It accepts User Device 102 requests for establishing encrypted connection, or tunnel, and is the endpoint of such encrypted connections from multiple User Devices 102. As a standard with VPN tunneling protocol endpoints, on establishing a VPN connection, or tunnel, with User Device 102, VPN Gateway 108 becomes the default gateway for User Device 102.

VPN Server Logic 110—a logical unit and a constituent of VPN Server 104, that can execute complex functions. It can be in a combination of hardware and software that is able to create and assign session ID for every request sent by User Device 102. In some embodiments, VPN Server Logic 110 is able to communicate through proxy protocols and to translate proxy protocol parameters into HTTP headers.

Proxy Media Server 112—can be a physical server or a server on the cloud that is a dedicated server that provides optimized handling of media streaming requests and allows User Device 102 to access media streaming services through proxies. It is a more complex unit consisting or in combination of Proxy Gateway 114 and Proxy Logic 116.

Proxy Gateway 114—can be any physical device within or in combination to the Proxy Media Server 112, that acts as a gateway or in other words connecting point between the VPN Server 104 and the Proxy Media Server 112. It can receive and forward all of the connections. It also can detect session ID and register the session for future reference.

Proxy Logic 116—a logical unit present within or in combination to Proxy Media Server 112 that is configured to translate proxy protocols into other protocols, including HTTP, that are supported by Proxy Service Provider 118. It is used in combination with hardware and software that is able to detect session ID and forward the connection on to the Proxy Service Provider 118.

Proxy Service Provider 118—a party providing the actual last-mile proxy as a service. Proxy service is a proxy server that acts as an intermediary for requests from clients seeking resources from other servers. Proxy services are distinguished based on the type of IP address the proxy uses, including but not limited to Residential IPs proxies, Datacenter IP proxies and Mobile IPs proxies.

Service Gateway 120—a constituent within the Proxy Service Provider 118 that acts as a gateway or in other words connecting point between Proxy Media Server 112 and Proxy Service Provider 118. It can be a physical device, a cloud service or software that provides connectivity to the Proxy Service Provider 118.

Pool Logic 122—is a logical unit that selects exit nodes and delegates Exit Nodes to service requests by User Device 102. It can be any device in combination with a software that is configured to assign specific Exit Nodes to requests made to the Proxy Service Provider 118.

Exit Node—EN1 124, EN2 126, EN3 128, EN4 130 are exemplary instances of Exit Nodes. The number of the Exit Nodes that the Proxy Service Provider 118 can store is not limited. The disclosure presents an exemplary drawing of such Exit Nodes, but the total number may vary according to the provider's infrastructure. An Exit Node is a proxy that is connected to a network and that is used to reach the First Target Server 132 or Second Target Server 134. The Exit Node can be any proxy device that is connected to the Network, for example, a laptop, a mobile phone, a tablet computer, or any other smart device.

First Target Server 132/Second Target Server 134—are exemplary instances of target servers. Target Server is a server serving any kind of media content accessible over many available protocols over the Internet. A Target can be, for example, a particular IP address, a domain name, and/or a hostname, possibly with a defined network protocol port, that represent(s) a resource address at a remote system serving the content accessible through industry standard protocols. A Target server is the physical or cloud server that contains the content requested through the target address.

Network 136—is a digital telecommunications network that allows nodes to share and access resources. Examples of a network: local-area networks (LANs), wide-area networks (WANs), campus-area networks (CANs), metropolitan-area networks (MANs), home-area networks (HANs), Intranet, Extranet, Internetwork, Internet.

Session ID—a piece of data that is used in network communication to identify a session. A session is a series of related requests sent by User Device 102. It is a unique string that VPN Server Logic 110 assigns to a specific User Device 102 for the duration of a User Device 102's session.

Network Rerouting—a process by which the requests of User Device 102 are rerouted and redirected from the First Target Server 132/Second Target Server 134 to pass through the Proxy Media Server 112. Network rerouting involves a firewall, which filters requests and reroutes them to Proxy Media Server 112 by rewriting the legitimate IP address of First Target Server 132/Second Target Server 134.

Firewall—a system that is designed to prevent User Device 102 from accessing the target servers directly. It can reroute User Device 102 requests.

Hash algorithm—a function that converts two concatenated strings of characters into a third string in such a way that the conversion is not reversible and the former cannot be deduced from the latter but the resulting hashed value is unique to the inputs. The output string is generally much smaller than the original data. Hash algorithms are meant to be collision-resistant, meaning that there is a very low probability that the same resultant string would be created for different data. In the case of our embodiment hash algorithm is used to generate a session ID for a particular session of User Device 102.

Hardware ID—is a manufacturer defined identification string that an operating system uses to match a device to a setup information file (INF). Hardware ID is a set of numbers and letters that uniquely identifies a computer or any device.

IP in IP (Protocol 4)—refers to a tunneling protocol that encapsulates one IP packet in another IP packet. The embodiment supports IP in IP tunnels with all possible combinations of IPv4 and IPv6; that is, IPv4 over IPv4, IPv6 over IPv4, IPv4 over IPv6, and IPv6 over IPv6.

SIT/IPv6 (Protocol 41)—is a transition mechanism and a tunneling protocol that encapsulates IPv6 packets on specially configured IPv4 links. It consists of the IPv6 packet preceded by an IPv4 packet header. It is a simple internet transition (SIT) and known as Protocol 41.

GRE (Protocol 47)—where GRE is an acronym for Generic Routing Encapsulation. It is a tunneling protocol that can encapsulate a wide variety of network layer protocols inside virtual point-to-point links or point-to-multipoint links over an Internet Protocol network.

OpenVPN (UDP port 1194)—is an open-source commercial software that implements VPN techniques. OpenVPN can run over User Datagram Protocol (UDP) or transmission control protocol (TCP) transports, on a single TCP/UDP port. UDP stands for User Datagram Protocol and is a simple connectionless communication model with a minimum of protocol mechanisms. UDP provides checksums for data integrity, and port numbers for addressing different functions at the source and destination of the datagram. UDP port numbers are used by protocols of the Internet protocol suite for operation of network applications.

SSTP (TCP port 443)—where SSTP is an acronym for Secure Socket Tunneling Protocol. It is a form of VPN tunnel that provides a mechanism to transport point to point traffic through a secure socket layer channel. The use of socket layer over TCP port 443 allows SSTP to pass through virtually all firewalls and proxy servers except for authenticated web proxies.

IPsec (Protocol 50 and 51)—where IPsec stands for Internet protocol security. It is a secure network protocol suite that authenticates and encrypts the packets of data to provide secure encrypted communication between two computers over an internet network. Protocol 50 is known as encapsulating security payload and it is a member of the IPsec protocol suite. It provides origin authenticity through source authentication, data integrity through hash functions and confidentiality through encryption protection for IP packets. Protocol 50 also supports encryption-only and authentication-only configurations. Protocol 51 is known as the authentication header and also a member of the IPsec protocol suite. Protocol 51 ensures connectionless integrity by using a hash algorithm and a secret shared key. It guarantees the data origin by authenticating IP packets.

L2TP (Protocol 115)—where L2TP is an acronym for Layer 2 Tunneling Protocol, it is a tunneling protocol used to support VPN Server 104 or as part of the delivery of services by internet service providers. It does not provide any encryption or confidentiality by itself. Rather, it relies on an encryption protocol that it passes within the tunnel to provide privacy.

VXLAN (UDP port 4789)—where VXLAN stands for Virtual Extensible Local Area Network, it is a network virtualization technology that uses a VLAN-like encapsulation technique to encapsulate OSI layer 2 Ethernet frames within layer 4 UDP datagrams.

WireGuard—a free and open-source software application and communication protocol that in one embodiment enables VPN Server 104 to create secure point-to-point connections in routed or bridged configurations. WireGuard fully supports IPv6, both inside and outside of the tunnel. It supports only layer 3 for both IPv4 and IPv6 and can encapsulate v4-in-v6 and vice versa.

QUIC—a transport layer network protocol which improves performance of connection-oriented web applications using transmission control protocol (TCP). It does this by establishing several multiplexed connections between two endpoints over User Datagram Protocol (UDP).

MD5—refers to a hash algorithm that produces a hash value in a hexadecimal format. MD5 is also known as a cryptographic hash algorithm. It accepts data of any length as input and returns output of a fixed length to be used for authenticating the original data. MD5 message-digest algorithm is a widely used hash function producing a 128-bit hash value.

Secure Hash Algorithm (SHA)—a hash algorithm series which takes an input and produces a 160-bit (20-byte) hash value typically rendered as a hexadecimal number, 40 digits long. The latest installment in the SHA series—SHA-3—is different from the MD5-like structure of previous installments SHA-1 and SHA-2. SHA-3 is based on a novel approach called sponge construction. Sponge construction is based on a wide random function and allows inputting any amount of data and outputting any amount of data, while acting as a pseudorandom function with regard to all previous inputs.

BLAKE—refers to a cryptographic hash algorithm that combines an 8-word hash value with 16 message words. Its variants include BLAKE 2, BLAKE3.

UUID—is an acronym for universally unique identifier which is a 128-bit number used to identify information in computer systems. UUID are unique and their uniqueness does not depend on coordination between the parties generating them or a centralized authority. The generation UUID is based on the current timestamp and the unique property of the party generating it.

Root server—a server that supports the DNS Server 106 by directly responding to the DNS requests and by returning a list of authoritative name servers for the appropriate top-level domain (TLD). Root server is an important part of the DNS Server 106 because it delegates the first step in translating the User device's 102 requests into IP addresses.

Authoritative name servers—a server that provides response to DNS requests or queries by providing IP addresses of the requested domain name. It provides original and definitive answers to DNS requests/queries as opposed to providing cached answers that were obtained from another name server.

DNS request/query—is a demand for information sent from the User Device 102 to a DNS Server 106. In most cases a DNS request is sent, to ask for the IP address associated with a domain name.

Private IP address—An IP address within certain ranges of IP addresses or subnets, that are set aside for User Device 102 in a VPN network. It is assigned to the User Devices 102 by the VPN Gateway 108 when the VPN connectivity is established. These private IP addresses are not visible on the Internet.

Tunneling or Tunnel—a protocol that allows for the secure movement of data from one network to another. Tunneling involves allowing private network communications to be sent across a public network, such as the Internet, through a process called encapsulation. The encapsulation process allows for data packets to appear as though they are of a public nature to a public network when they are actually private data packets, allowing them to pass through unnoticed. Encapsulation allows the packets to arrive at their proper destination. At the final destination, decapsulation and decryption occur.

Sticky session—refers to the feature of the current embodiment to route all requests of User Device 102 for a particular session to the same Exit node that serviced the first request for that session.

Proxy protocol V2—refers to a TCP based internet protocol that allows the transportation of the User Device details like IP address and port over multiple proxies. Proxy protocol v2 adds meta information about the proxied TCP User Device 102 at the beginning of the TCP stream, which suggests that proxy protocol information is the first information that is sent in a network communication.

Figure 1:
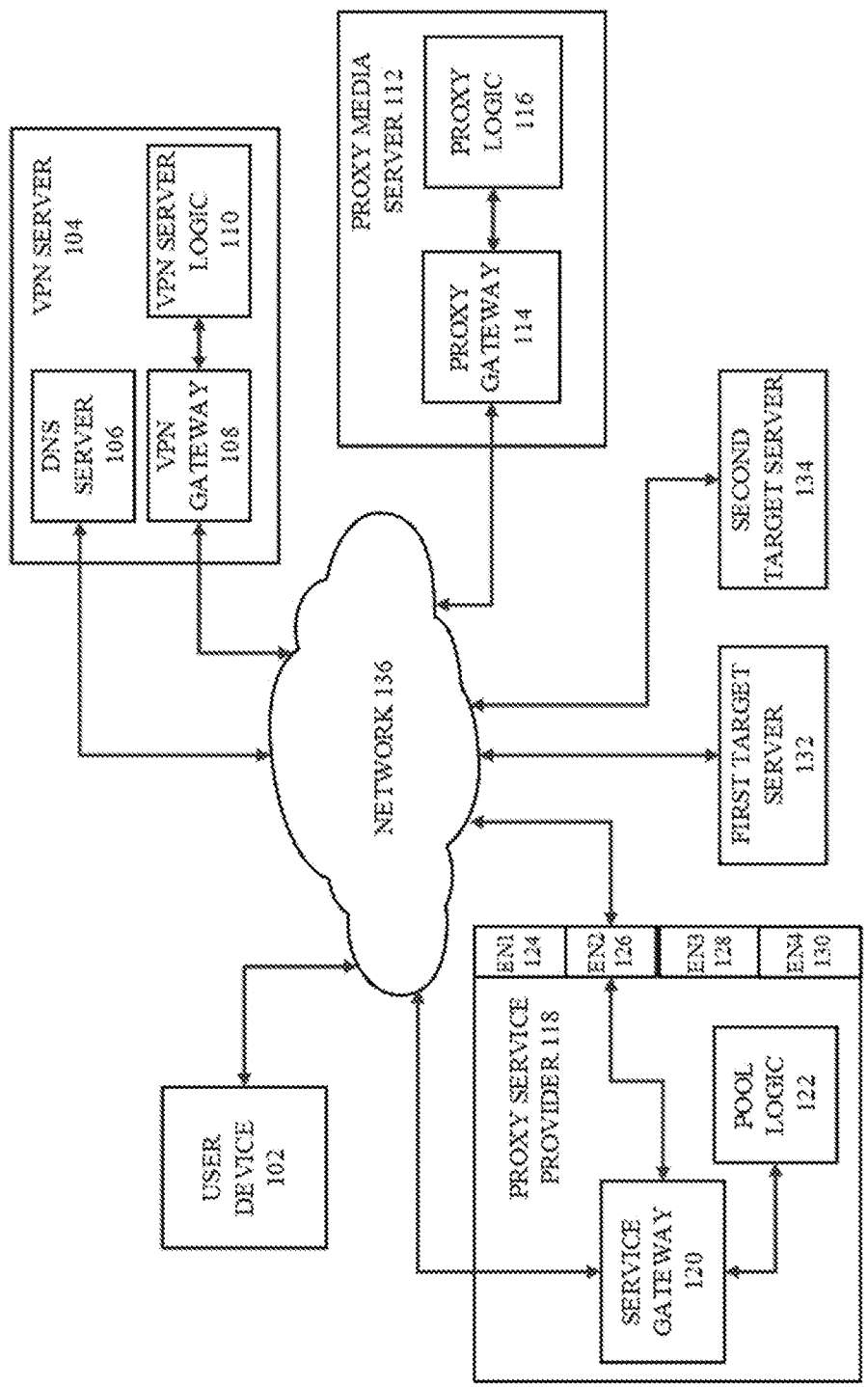
FIG. 1 shows a block diagram of an exemplary architectural depiction of components.

FIG. 1 shows an exemplary overall architecture of the current embodiment that comprises of User Device 102, which can be any computing or a networking device (e.g., a personal computer, mobile phone, a tablet computer, router, smart home device) having access (e.g. Internet connection) to a particular network, a VPN Server 104, Proxy Media Server 112, Proxy Service Provider 118, First Target Server 132 and Second Target Server 134. All the mentioned components of the embodiments have access to the Network 136 and are able to interact with each other through the same. Here, Network 136 can be any digital telecommunication network that permits several nodes to share and access resources, e.g. local-area network (LAN), wide-area networks (WANs), campus-area networks (CANs), metropolitan-area networks (MANs), home-area networks (HANs), Intranet, Extranet, Internetwork, Internet. Proxy Server Provider 118 can be a third-party service provider in combination with the current embodiment. The VPN Server 104 in turn contains the following: DNS Server 106, VPN Gateway 108, VPN server logic 110. Similarly, the Proxy Media Server 112 contains the following: Proxy Gateway 114 and Proxy logic 116. Likewise, the Proxy Service Provider 118 consists of the following: Service Gateway 120, Pool Logic 122, and a plurality of the Exit nodes examplarery titled as EN1 124, EN2 126, EN3 128, EN4 130. While the elements shown in the FIG. 1 implement the exemplary embodiment, some elements in other embodiments can have different titles or can be combined into a single element instead of two separate elements (for example, Proxy Gateway 114 and Proxy logic 116 can be combined into a single hardware, software infrastructure to form a single logical unit or can also be combined into a single logical unit on a cloud. Likewise, Service Gateway 120 and Pool Logic 122 can also be combined into a single hardware software infrastructure or can be combined to a single unit on a cloud.) However, the functionality of elements and the flow of information between the elements is not impacted generally by such combinations or consolidations. Therefore, FIG. 1 as shown should be interpreted as exemplary only, and not restrictive or exclusionary of other features, including features discussed in other areas of this disclosure here within.

In FIG. 1 all occurrences of communication between the various components of the current embodiment takes place through Network 136. The instances of communication between User Device 102 and the VPN Server 104 can happen through an encrypted tunneling protocol provided by VPN Gateway 108 which can include the process of authentication and authorization to enable data exchange between User Device 102 and the VPN Server 104. Likewise, the instances of communication between the VPN Server 104 and the Proxy Media Server 112 can be over proxy protocol v2 or any of the following protocol defined above, IP in IP (Protocol 4): IP in IPv4/IPv6; SIT/IPv6 (Protocol 41): IPv6 in IPv4/IPv6; GRE (Protocol 47): Generic Routing Encapsulation; OpenVPN (UDP port 1194); SSTP (TCP port 443):

Secure Socket Tunneling Protocol; IPSec (Protocol 50 and 51): Internet Protocol Security; L2TP (Protocol 115): Layer 2 Tunneling Protocol; VXLAN (UDP port 4789): Virtual Extensible Local Area Network; WireGuard; Quic. However, the instances of communication between the Proxy Media Server 112 and Proxy Service Provider 118 in some embodiments can be limited to HTTP protocol or can include one or any of the protocols mentioned above. However, the types of protocols used by Proxy Service Provider 118 are not controlled by VPN Server 104.

DNS requests and the resolution of the same occurs between User Device 102 and the DNS Server 106. The communication between User Device 102 and DNS Server 106 can occur through the Network 136 which facilitates all communication among various components of the current embodiment. It involves translating a human-friendly domain name into its respective IP address. In one embodiment, VPN Gateway 108 and VPN Server Logic 110 can be two different elements present within the VPN Server 104. VPN Gateway 108 is responsible for establishing the tunneling protocol with User Device 102 through the Network 136 and also responsible for forwarding User Device 102 requests. VPN Server Logic 110 creates Session ID for User Device 102 sessions that are routed to Proxy Media Server 112 through Network 136. Proxy Logic 116 can translate Session ID attributes contained in one protocol into other protocols that are supported by the Proxy Service Provider 118. Proxy Gateway 114 forwards it to the Service Gateway 120. Service Gateway 120 provides access to Pool Logic 122 which is responsible for assigning Exit Nodes. Exit Node is the final point that makes connection with First Target Server 132 or Second Target Server 134.

One must note that Proxy Gateway 114 handles receiving and forwarding the requests and sending back the responses to the VPN Server 104 through Network 136. Likewise, the Service Gateway 120 acts as gateway or an access point for the Proxy Service Provider 118 that is responsible for forwarding the connection and sending back the responses form Exit Nodes (e.g. EN2 126) to Proxy Media Server 112 through the Network 136. First Target Server 132 and Second Target Server 134 can be any media streaming servers, including but not limited to video and audio content streaming, online gaming or online gambling services.

The Primary purpose of the embodiment described herein is to effectively create an affinity or in other words stickiness between a particular session of the user device and a specific exit node (for example, EN2 126) through creating a session identification that is unique for a particular session of User Device 102. In one aspect the current embodiment is able to route all User Device 102 requests of a particular session through the same exit node (for example, EN2 126) that serviced the first request for that session. The creation of a distinct session identification string serves this purpose. In another aspect, the embodiment is able to translate the parameters of the session identification string from one protocol into other protocols that are supported by the Proxy Service Provider 118.

When User Device 102 initiates a connection to the VPN Server 104 though the Network 136, the VPN Gateway 108 provides point to point contact with User Device 102 and establishes a secure connection with it. VPN connectivity is established by an encrypted tunneling protocol. All requests from User Device 102 are sent through this encrypted tunnel where the request packets are encoded and secure. This encoding of packets is known as the encapsulation and enables data packets to appear as though they are of a public nature to a public network but in fact they are actually private data packets, making them to pass unnoticed. During the establishment of this point to point tunneling connection, VPN Gateway 108 assigns a private IP address to User Device 102 that is entirely different form the original IP address. All requests originating from User Device 102 have this new private IP address assigned to it. Also, one must note that this private IP address is exclusive to the individual user device within the VPN server but it is not globally unique—other users on other servers might have the same private IP address. However, since the private IP address is only used for communications between a particular VPN Server 104 and User Device 102, there is no ambiguity.

Once User Device 102 establishes a secure connection with VPN Server 104, all requests originating from User Device 102 are sent through the VPN Server 104 on behalf of User Device 102. When User Device 102 initiates a request for accessing a media streaming server (for example, First Target Server 132) through a domain name, the DNS Server 106 present within the VPN Server 104 resolves the domain name to the respective IP address. The DNS Server 106 receives the domain name and directs it to the root server and receives the details of Top-Level Domain name (TLD) server. Through the TLD name server, the root server receives the details of an authoritative name server and requests for IP addresses that match the desired domain name and receives it. Through these subsequent steps the DNS Server 106 within the VPN Server 104 resolves the domain name requests sent by User Device 102.

The User device's 102 request is then passed on to the VPN Gateway 108 which receives it and creates a unique identification to denote the current session. VPN Server Logic 110 takes the private IP address of the user device that was assigned by VPN Gateway 108 and combines it with the external IP address of VPN Server 104 and forms a session identification string that is unique to that session. This session identification string is exclusive as long as the user device does not disconnect from that particular session, remains inactive or the timer runs out (which might be set to several minutes, seconds, hours, days, or any period of time). This unique session identification string is vital in maintaining the "sticky session" or in other words affinity towards a particular exit node throughout that session. In addition to creating the unique session identification string, VPN Server Logic 110 also stores the private IP address of User Device 102 in its database. This allows VPN Gateway 108 to remember User Device 102 and assign the unique session identification string for all separate requests from User Device 102 in a particular session. All requests from User Device 102 will have this session identification string attached to it so that these requests can be treated as the same session. After creating the session identification string that is unique to a session, User Device 102 sends forth the request accompanied by the session identification string to Proxy Media Server 112 over a particular protocol (for example, proxy protocol v2).

Proxy Media Server 112 receives the request from the VPN Server 104 and reads for the unique session identification string that was sent through proxy protocol v2 header. Once Proxy Media Server 112 identifies the session identification string it stores the string in the database and Proxy Logic 116 translates the parameters of the session identifications string from proxy protocol v2 to other protocols that are supported by Proxy Service Provider 118. This translation is essential because it instructs Proxy Service Provider 118 to assign an exit node (for example, EN2 126) to a unique session identification string. Therefore, Proxy Service Provider 118 assigns the same exit node to all requests containing the same session identification string.

Figure 2A:
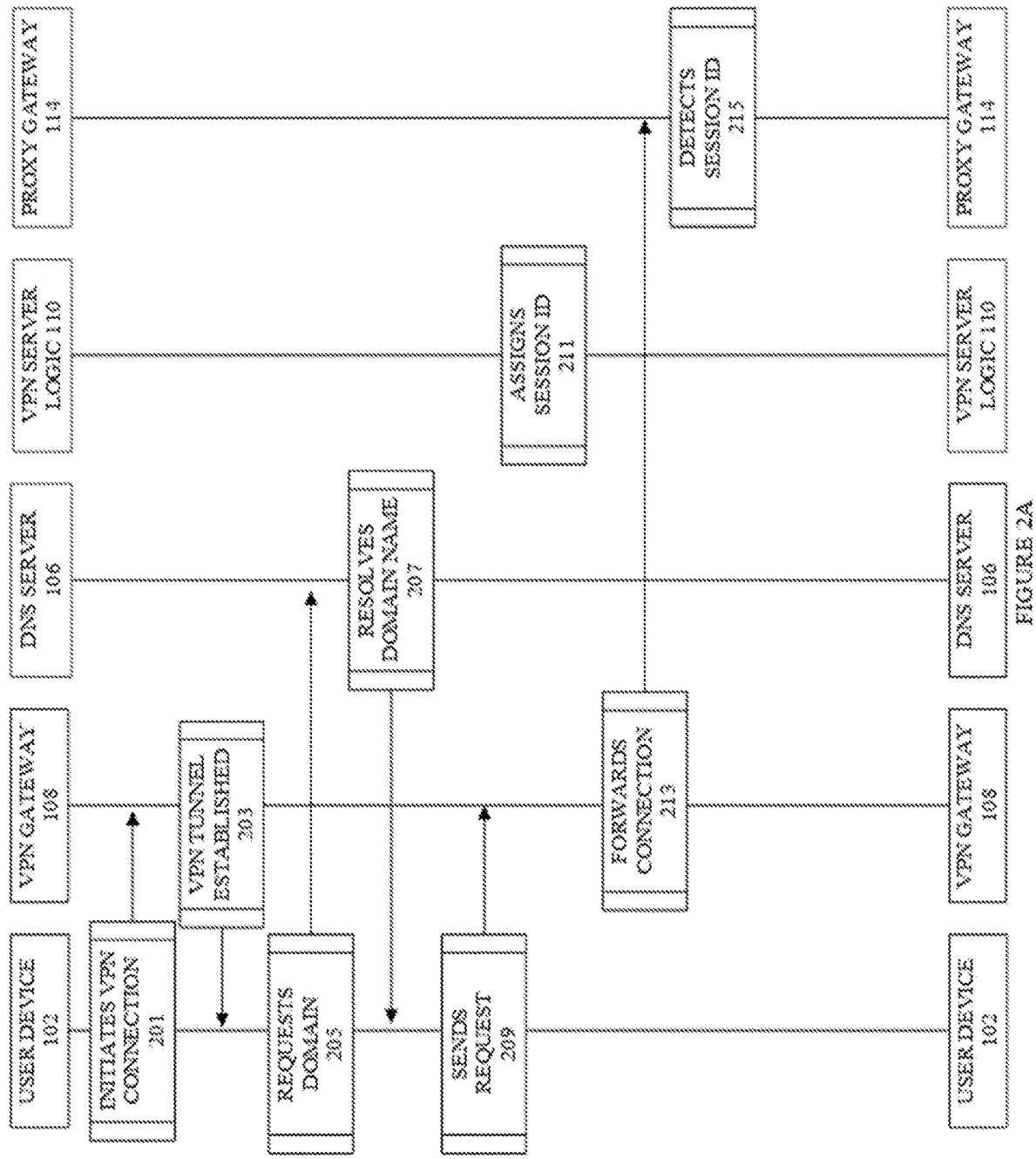
FIG. 2A shows an exemplary flow diagram of making and forwarding a first request.

The following figures illustrate this process and the various embodiments involved with more technical detail. FIG. 2A shows an exemplary flow diagram of making and forwarding a sticky request. In step 201, User Device 102 initiates a VPN connection with VPN Server 104 and more specifically by addressing VPN Gateway 108. This action on User Device 102 can happen through a software application installed on User Device 102 that has a dashboard or other user interface. However, User Device 102 can engage in a VPN connection with the VPN Gateway 108 by configuring their system network settings more directly.

In step 203, Once VPN Gateway 108 receives the request to connect, it creates a VPN tunnel between itself and User Device 102. The tunnel is established by VPN Gateway 108 receiving User Device 102 requests from its public IP address, then returning a response with a newly assigned private IP address and a private IP address of the VPN Gateway 108 through which User Device 102 can communicate with VPN Gateway 108 in a private way. All the subsequent communication is done through the tunnel created by User Device 102 and VPN Gateway 108. The connection is private (secure) because symmetric cryptography is used to encrypt the data transmitted. Usually, the keys for this symmetric encryption are generated uniquely for each connection and are based on a shared secret that was negotiated at the start of the session. The server and client negotiate the details of which encryption algorithm and cryptographic keys to use before the first byte of data is transmitted. The negotiation of a shared secret is both secure (the negotiated secret is unavailable to eavesdroppers and cannot be obtained, even by an attacker who places themselves in the middle of the connection) and reliable (no attacker can modify the communications during the negotiation without being detected).

The identity of the communicating parties can be authenticated using public-key cryptography. This authentication can be optional but is generally required for at least one of the parties (typically the server). The connection is reliable because each message transmitted includes a message integrity check using a message authentication code to prevent undetected loss or alteration of the data during transmission.

In step 205, after the VPN tunnel is established and secured, User Device 102 is able to make requests and access the target servers privately without its public IP being revealed. Once a User Device 102 makes a request to access a domain First Target Server 132 (for example, a video streaming service, a gaming or gambling platform), VPN Server 104 receives the request to resolve the domain name into the target IP address. In one of the embodiments, the DNS Server 106 present in the VPN Server 104 is configured to redirect User Device 102's requests to the Proxy Media Server 112 by the VPN Server 104 itself. It means that instead of the preconfigured DNS server in User Device 102, VPN Server 104 resolves the name in its own DNS Server 106 which relays the request not to the First Target Server 132 directly but through Proxy Media Server 112 that is uniquely equipped to handle such requests as streaming, gaming, and gambling. This works by DNS Server 106 resolving the domain name of First Target Server 132 into the IP address of Proxy Media Server 112.

In step 209, User Device 102 sends a request to the IP address resolved by the DNS Server 106 through VPN Server 104. Upon receiving the request and recognizing that the IP address of the request belongs to Proxy Media Server 112, VPN Server 104 decides to make User Device 102 session sticky.

An alternative method employed in one of the embodiments to redirect User Device 102 request to the Proxy Media Server 112 is through network rerouting. VPN Server 104 has a built-in Firewall that is utilized for the purpose, when the current embodiment is configured to carry out the process of network rerouting.

So, in one of the embodiments, right after the VPN tunnel is established, in step 205 User Device 102 sends a request in order to access the target servers privately without revealing its IP address. But before routing User Device 102 request to the First Target Server 132 directly, the Firewall present within the VPN Server 104 is configured to reroute the request of User Device 102 and rewrites the IP address of the First Target Server 132 into the IP address of the Proxy Media Server 112. In this way, User Device 102 request is directed to Proxy Media Server 112. Upon recognizing the IP address of the Proxy Media Server 112, the VPN Server 104 decides to render the current session sticky and forwards to create session ID in step 211 through the VPN Server Logic 110.

One must recognize that the current embodiment described herein, is not limited to carry out DNS spoofing in order to redirect User Device 102 request but also capable of implementing network rerouting through the Firewall as a way to redirect the requests of User Device 102 away from the target servers and towards the Proxy Media Server.

In step 211, VPN Server Logic 110 creates and assigns a unique session ID to User Device 102 session. In some embodiments, it records the session ID in a database table which can be used to sort responses according to unique session IDs. The creation of session ID can be constituted in different ways and communicated through different protocols that all make up embodiments presented herein.

In one exemplary embodiment, session ID is created by a hashing algorithm. It means that a unique combination of values is hashed to make a unique string of numbers or characters that uniquely identify a session. The hashed string will depend on the input or inputs used and the hashing algorithm. The combinations of hashing algorithms and inputs constitute but do not limit the scope of any of the embodiments.

VPN Server Logic 110 has available to it a variety of unique combinations of inputs to be hashed. In one embodiment, inputs can be Network IDs. Network IDs are identification strings that can originate from the network configuration of the VPN Server 104 or User Device 102. For example, the private IP of User Device 102 and the public IP of VPN Server 104. It is a unique combination because all public IPs are unique and every server assigns only one private IP per active User Device 102. No logs of User Device 102 activity is saved. It means that every time User Device 102 connects it is treated as a new session and new private IP is assigned.

Other embodiments can use Hardware IDs as inputs. Hardware IDs include but are not limited to hardware product IDs, serial numbers, and similar hardware related information. Hardware IDs are of two varieties. The first includes serial numbers assigned to every computer component produced. However, these are not unique and only signify the manufacturer, date, and model of a component. Yet there is another type of Hardware ID (sometimes referred to as a computer hardware ID, or CHID) that is uniquely generated every time that a computer boots up. Additionally, some versions of Hardware ID include an SKU (Stock Keeping Unit) number that uniquely identifies a piece of hardware. If such Hardware ID is used for hashing together with a private IP address of User Device 102, it will produce a unique session identifier. It will be unique because when a new user device is assigned the same private IP address, it will not have the same Hardware ID.

Other embodiments use different hardware related unique IDs like product_uuid or cpu_uuid. Those values are generated in kernel code. A UUID (universally unique identifier) in general is an identifier that is designed to be unique across both time and space. It requires no central registration process. The UUID is 128 bits long. UUIDs often use the following components or any unique combination thereof: low field of the timestamp, middle field of the timestamp, high field of the timestamp multiplexed with the version number, high field of the clock sequence multiplexed with the variant, low field of the clock sequence, spatially unique node identifier. UUID can again be hashed together with a private IP address of User Device 102, it will produce a unique session identifier that will last as long the VPN tunnel lasts. It will be unique because when a new user device is assigned the same private IP address, it will not have the same Hardware ID.

In addition to hardware IDs, VPN Server Logic 110 can also use Software Generated IDs for hashing a unique string. Software Generated IDs are unique strings that are generated by any kind of software either on the VPN Server 104 or User Device 102. One example of an embodiment using software generated IDs is creating a hash containing a unique machine ID of the local system that is set during installation or boot. The machine ID is a single newline-terminated, hexadecimal, 32-character, lowercase ID. When decoded from hexadecimal, this corresponds to a 16-byte/128-bit value. This ID may not be all zeros. The machine ID is usually generated from a random source during system installation or first boot and stays constant for all subsequent boots. Optionally, for stateless systems, it is generated during runtime during early boot if necessary. The machine ID may be set, for example when network booting. Similarly, a boot ID could be used which is the message generated and formatted as a 128-bit hexadecimal string during boot.

Another unique software feature that can be used in some embodiments to produce a unique hash involved network connectivity information, like a hostname which is a label that is assigned to a device connected to a computer network and that is used to identify the device in various forms of electronic communication. Hostnames may be simple names consisting of a single word or phrase, or they may be structured. A hostname is a unique name for a computer or network node in a network. They can describe both physical addresses and network nodes, which have multiple domains under one host.

Another example of a unique identifier generated based on network information is HostID which is the physical hardware number of the Ethernet Network Interface Card (NIC). The HostID is sometimes called Ethernet address or MAC-address (Media Access Control address). Host ID is a specific piece of information which uniquely identifies a computer. It is often used to verify computers in a licensing agreement but it can also be used to create a unique combination to be hashed for session ID. Again, these unique identifiers can be combined with the private IP address of User Device 102 to create a unique combination that lasts as long as a session lasts.

In some embodiments, in addition to a unique identifier combination, a cryptographic salt is also used. Salt is a random character string that is used as an additional input. Salts are used to safeguard Session IDs in storage. Salts are generated randomly and are not available to the public. Salts can be unique to a single VPN server or VPN tunnel. Salts can last a fixed amount of time or can be created every time a VPN tunnel is created. Salts are generated in standard ways that random strings are generated, including Elliptic Curve Digital Signature Algorithm (ECDSA), Probabilistic Signature Scheme (RSASSA-PSS).

Moreover, different embodiments can involve different hashing algorithms to produce the unique strings to be used as session ID. Some exemplary algorithms used by some of the embodiments include cryptographic algorithms such as MD5 and SHA-3.

Different embodiments can use any combination of the unique combination of inputs and hashing algorithms. However, in all embodiments session ID is the resulting string of characters that is hashed from unique inputs to the session ID and is not reversible, i.e. it cannot be hashed back to the original constituents.

In one embodiment, additionally to a unique combination of identifiers, VPN Server Logic 110 also adds to the hash target server hostname of the First Target Server 132. Such an addition changes the functionality of the session ID because the session ID only lasts within the constraints of the particular target hostname. If User Device 102 requests a different hostname, that request is serviced without the same attached session ID (because the hash will be different). Although this method might be less flexible for User Device 102, it ensures that an exit node is used only for a particular target to which it was intended. This might be beneficial to both the VPN provider and Proxy Service Provider 118 that usually reserve the best exit nodes for streaming, gaming, and gambling services.

The session ID—which is built from the unique hash—can be designed to live indefinitely, i.e. as long as the input combination remains unique. So, if boot-related IDs are used together with private IP in the VPN tunnel, the session ID will live as long as User Device 102 reboots or loses connection to the VPN tunnel. However, in some embodiments, session ID is predetermined to live only for a certain period of time, for example, an hour, several hours, minutes, days or other period of time. The lifetime of the session ID can also be tied to the inactivity period of User Device 102, so that sticky exit nodes are not occupied when not in use.

Once VPN Server Logic 110 produces the hash for session ID, it assigns it to the request by User Device 102. In step 213, VPN Gateway 108 forwards that request to Proxy Gateway 114 located in Proxy Media Server 112. In different embodiments, the forwarding can happen in any of the following protocols, defined above IP in IP (Protocol 4): IP in IPv4/IPv6; SIT/IPv6 (Protocol 41): IPv6 in IPv4/IPv6; GRE (Protocol 47): Generic Routing Encapsulation; OpenVPN (UDP port 1194); SSTP (TCP port 443): Secure Socket Tunneling Protocol; IPSec (Protocol 50 and 51): Internet Protocol Security; L2TP (Protocol 115): Layer 2 Tunneling Protocol; VXLAN (UDP port 4789): Virtual Extensible Local Area Network; WireGuard; Quic.

Upon receiving the request, in step 215, Proxy Gateway 114 detects that session ID parameter is attached to the request and thus recognizes that this is a sticky session request. Proxy Gateway 114 also determines that stickiness request has to be accommodated by the eventual Proxy Service Provider 118. However, it is not always the case that Proxy Service Provider 118 is able to communicate in the same protocols as VPN Gateway 108 and Proxy Media Server 112 do.

Figure 2B:
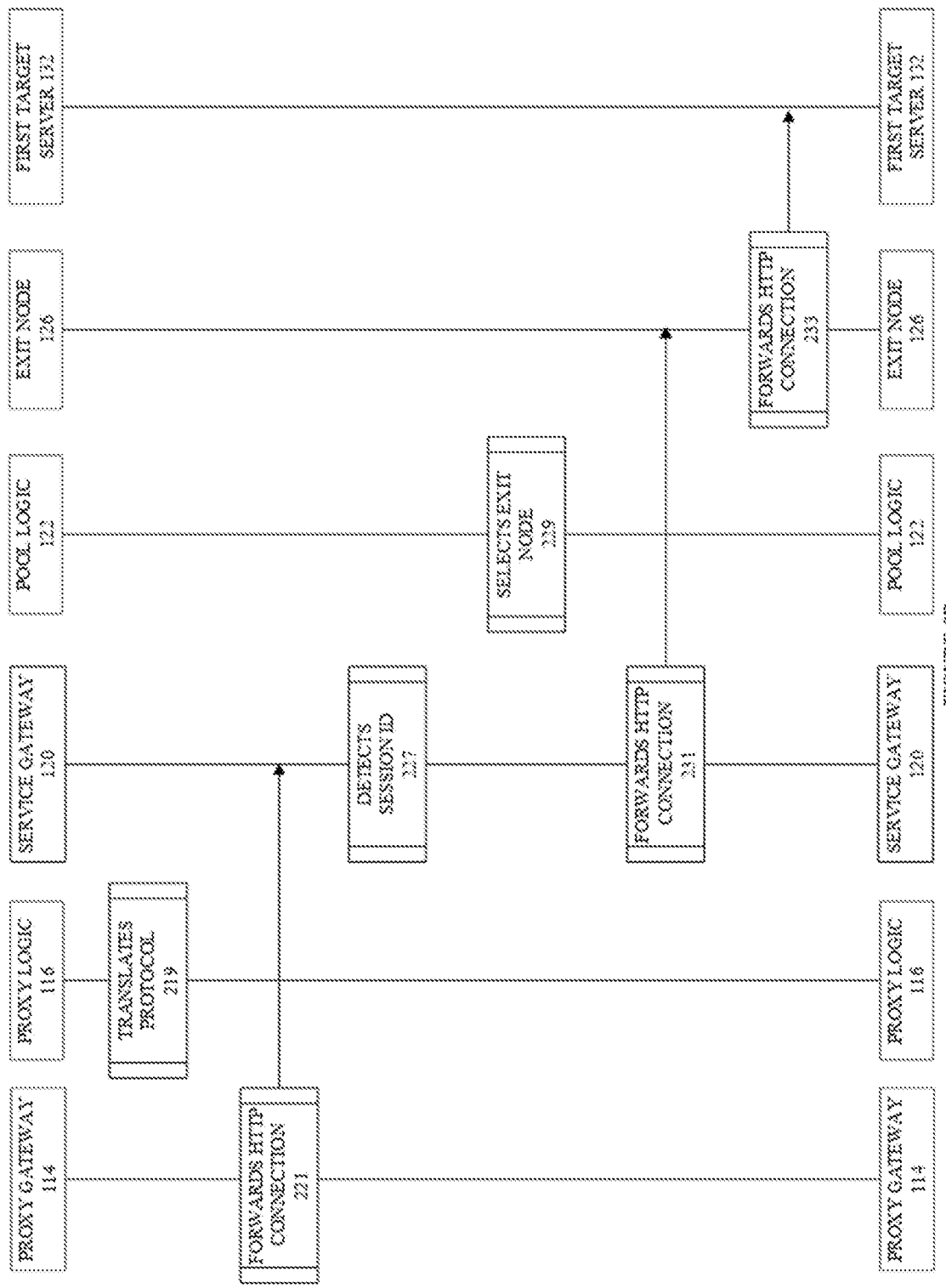
FIG. 2B shows the continuation of the exemplary flow diagram of making and forwarding a first request.

FIG. 2B shows the continuation of the exemplary flow diagram of making and forwarding a first request. To solve the issue that Proxy Service Provider 118 is not able to communicate in the same protocols as VPN Gateway 108 and Proxy Media Server 112, in step 219, Proxy Logic 116 performs a translation of session ID from the previously used protocol to the means that can be used by the Proxy Service Provider 118. Some of the ways that Proxy Logic 116 can choose to relay the session ID parameter include but are not limited to sending Session ID as a part of username when authenticating with the third party Proxy Service Provider 118. In this way, the booked session is already authenticated with the unique Session ID string and all the subsequent requests will stick to the exit node chosen by Proxy Service Provider 118.

Moreover, Session ID can be relayed to Proxy Service Provider 118 also by including it in the HTTP header of the request. In this way, Proxy Service Provider 118 will recognize that all requests containing the same Session ID in the HTTP request header have to be assigned to the same exit node. In some cases, Proxy Service Provider 118 might even support protocols other than HTTP, for example, Proxy Protocol V2. One of the attributes Proxy Protocol V2 contains the pp2_tlv field that accepts Type-Length-Value data. If the length specified in the Proxy Protocol V2 header indicates that additional bytes are part of the header beyond the address information, Proxy Service Provider 118 may choose to interpret those bytes. The information in those bytes will be arranged in Type-Length-Value (TLV vectors). The first byte is the Type of the vector. The second two bytes represent the length in bytes of the value (not included the Type and Length bytes), and following the length field is the number of bytes specified by the length. In one of the embodiments, Session ID is communicated to the Proxy Service Provider 118 as a TLV value if Proxy Service Provider 118 accepts and interprets the additional strings.

For example, session ID in proxy protocol can be specified as "0500076578616d706c65". This string consists of type "05" (PP2_TYPE_UNIQUE_ID), length "0007" and the value "6578616d706c65." However, if Proxy Service Provider 118 does not support proxy protocol, it can receive session ID translated into a HTTP header, for example:
  CONNECT server.example.com:80 HTTP/1.1
  Host: server.example.com:80
  Proxy-Authorization: Basic aGVsbG86d29ybGQ=X-T-Messenger-Session: ZXhhbXBsZQo=<-- base64 session ID In one embodiment, however, Proxy Media Server 112 can be skipped or fully integrated within the functionalities of the VPN Server 104. In that case, VPN Server 104 can communicate directly with Proxy Service Provider 118 and the need for translation of protocols arises at VPN Server 104. However, the same functionality that is present in Proxy Logic 116 can be implemented in VPN Server Logic 110. So, in one embodiment, the same translation procedure can be performed by VPN Server Logic 110 if it is required for VPN Server 104 to directly communicate with Proxy Service Provider 118.

In step 221, Proxy Gateway 114 forwards the HTTP request to Service Gateway 120 through HTTP or, if Proxy Service Provider 118 supports it, relays it through Proxy Protocol v2. In step 227, Service Gateway 120 reads and recognizes that Session ID is present in the request. It can either recognize that through authentication, by reading the HTTP header or by interpreting the pp2_tlv field. In step 229, Proxy Logic 116 comes to choose an exit node to service the HTTP request. There are various mechanisms that Proxy Logic 116 can employ to determine which exit node will be chosen to service the request. However, based on the information provided in the HTTP header or other means, Proxy Logic 116 can determine that this particular request (for example, to reach First Target Server 132) requires an exit node with a particular set of qualities. Types of data that can be used to choose an exit node include frequency, intervals, and schedule at which an exit node connects, the geolocation of exit nodes, their IP type, consent to participate in CDN proxying, and others; also dynamic parameters, like time seen, session duration and timestamps, timestamps of idleness, current total traffic, traffic per day or other period of time, response time, latency, target, battery life, and others; such data can also include aggregated dynamic parameters over any period of time (average speed, average session duration and timestamps, average traffic, average response time, average latency, most/least visited targets, error rate with a particular target, variations in which median and percentile groups are used instead of average values, and others) in any combination and with any weights associated with the parameters. By using such data Proxy Logic 116 is able to determine which exit node will be the most fitting to access First Target Server 132 or other targets.

In one exemplary instance, Proxy Logic 116 chooses an exit node EN2 126. Then in step 231, Service Gateway 120 relays the HTTP request to EN2 126 that services it. In step 233, EN2 126 accesses the First Target Server 132 to retrieve the data requested.

FIG. 3 represents an exemplary flow diagram of returning first response after the request has reached First Target Server 132. In step 301, First Target Server 132 returns an HTTP response with the requested data to EN2 126. In step 303, EN2 126 relays that same response to Service Gateway 120. In step 305, Service Gateway 120 forwards the HTTP request to Proxy Gateway 114. In step 307, Proxy Gateway 114 forwards the HTTP request to VPN Gateway 108 which in step 309 returns the data to User Device 102 through the established VPN tunnel. All of the returning communication happens transparently and no element of the chain is rerouting, reading or logging the data. In other words, there is no man in the middle rerouting. Depending on the type of connection protocol that First Target Server 132 uses, the communication can be encrypted, for example if HTTPS protocol is used.

FIG. 4A shows an exemplary flow diagram of making a second request during the same sticky session. The second request, in one embodiment, is a request that falls under a different subdomain (Second Target Server 134) of the same service as the first request (First Target Server 132). So, it might be that the first request was used to authenticate a user and the second request is used for the actual media streaming. It is the purpose of the sticky session to make sure that these two requests are serviced by the same exit node. In step 401, User Device 102 is able to make a request to access the target servers privately without its public IP being revealed through the already established VPN tunnel. Once a User Device 102 makes a request to access a domain Second Target Server 134 (for example, a subdomain of a video streaming service, a gaming or gambling platform), VPN Server 104 receives the request to resolve the domain name into the target IP address. In step 403, in one of the embodiments, the DNS Server 106 present in the VPN Server 104 is spoofed by the VPN Server 104 itself. It means that instead of the preconfigured DNS server in User Device 102 VPN Server 104 resolves the domain name in its own DNS Server 106 which relays the request not to the Second Target Server 134 directly but through Proxy Media Server 112 that is uniquely equipped to handle such requests as streaming, gaming, and gambling. This works by DNS Server 106 resolving the domain name of Second Target Server 134 into the IP address of Proxy Media Server 112.

An alternative method employed in one of the embodiments to redirect User Device 102 request to the Proxy Media Server 112 is through network rerouting. VPN Server 104 has a built-in Firewall that is utilized for the purpose, when the current embodiment is configured to carry out the process of network rerouting.

So, in one of the embodiments, right after the VPN tunnel is established, in step 205 User Device 102 sends a request in order to access the target servers privately without revealing its IP address. But before routing User Device 102 request to the First Target Server 132 directly, the Firewall present within the VPN Server 104 is configured to reroute the request of User Device 102 and rewrites the IP address of the First Target Server 132 into the IP address of the Proxy Media Server 112. In this way, User Device 102 request is directed to the IP address of Proxy Media Server 112. Upon recognizing the IP address of the Proxy Media Server 112, the VPN Server 104 decides to render the current session sticky and forwards to create session ID in step 211 through the VPN Server Logic 110.

One must recognize that the current embodiment described herein, is not limited to carry out DNS spoofing in order to redirect User Device 102 request but also capable of implementing network rerouting through the Firewall as a way to redirect the requests of User Device 102 away from the target servers and towards the Proxy Media Server.

In step 405, User Device 102 sends a request to the IP address resolved by the DNS Server 106 through VPN Server 104. Upon receiving the request and recognizing that the IP address of the request belongs to Proxy Media Server 112, VPN Server 104 decides to retain User Device 102 in a sticky session. This means that VPN Server 104 will continue to service the second request with the same session ID as the first request.

In step 407, VPN Server Logic 110 assigns the same unique session ID to User Device 102 session as was used to service the previous request. In some embodiments, it retrieves the session ID from a database table which is used to sort responses according to unique session IDs.

In step 409, VPN Gateway 114 forwards the request with the session ID to Proxy Gateway 114. Upon receiving the request, in step 411, Proxy Gateway 114 detects that session ID parameter is attached to the request and thus recognizes that this is a sticky session request. Proxy Gateway 114 also determines that stickiness request has to be accommodated by the eventual Proxy Service Provider 118. However, it is not always the case that Proxy Service Provider 118 is able to communicate in the same protocols as VPN Gateway 108 and Proxy Media Server 112 do.

FIG. 4B shows the continuation of the exemplary flow diagram of making and forwarding a second sticky request. To solve the issue above (that Proxy Service Provider 118 is not able to communicate in the same protocols as VPN Gateway 108 and Proxy Media Server 112), in step 415, Proxy Logic 116 performs a translation of session ID from the previously used protocol to the means that can be used by the Proxy Service Provider 118. Some of the ways that Proxy Logic 116 can choose to relay the session ID parameter include but are not limited to sending Session ID as a part of username when authenticating with the third party Proxy Service Provider 118. In this way, the booked session is already authenticated with the unique Session ID string and all the subsequent requests will stick to the exit node chosen by Proxy Service Provider 118.

Moreover, Session ID can be relayed to Proxy Service Provider 118 also by including it in the HTTP header of the request. In this way, Proxy Service Provider 118 will recognize that all requests containing the same Session ID in the HTTP request header have to be assigned to the same exit node. In some cases, Proxy Service Provider 118 might even support protocols other than HTTP, for example, Proxy Protocol V2. One of the attributes Proxy Protocol V2 contains the pp2_tlv field that accepts Type-Length-Value data. If the length specified in the Proxy Protocol V2 header indicates that additional bytes are part of the header beyond the address information, Proxy Service Provider 118 may choose to interpret those bytes. The information in those bytes will be arranged in Type-Length-Value (TLV vectors). The first byte is the Type of the vector. The second two bytes represent the length in bytes of the value (not included the Type and Length bytes), and following the length field is the number of bytes specified by the length. In one of the embodiments, Session ID is communicated to the Proxy Service Provider 118 as a TLV value if Proxy Service Provider 118 accepts and interprets the additional strings.

In one embodiment, however, Proxy Media Server 112 can be skipped or fully integrated within the functionalities of the VPN Server 104. In that case, VPN Server 104 can communicate directly with Proxy Service Provider 118 and the need for translation of protocols arises at VPN Server 104. However, the same functionality that is present in Proxy Logic 116 can be implemented in VPN Server Logic 110. So, in one embodiment, the same translation procedure can be performed by VPN Server Logic 110 if it is required for VPN Server 104 to directly communicate with Proxy Service Provider 118.

In step 417, Proxy Gateway 114 forwards the HTTP request to Service Gateway 120 through HTTP or, if Proxy Service Provider 118 supports it, relays it through Proxy Protocol v2. In step 419, Service Gateway 120 reads and recognizes that Session ID is present in the request. It can either recognize that through authentication, by reading the HTTP header or by interpreting the pp2_tlv field. In step 425, Proxy Logic 116 comes to choose an exit node to service the HTTP request. However, since the second request contains the same session ID as the first request, Proxy Logic 116 chooses the same exit node, thus making the session sticky. In one exemplary instance, Proxy Logic 116 chooses the same exit node—EN2 126. Then in step 427, Service Gateway 120 relays the HTTP request to EN2 126 that services it. In step 429, EN2 126 accesses the Second Target Server 134 to retrieve the data requested.

FIG. 5 shows an exemplary flow diagram of returning second response after the request has reached Second Target Server 134. In step 501, Second Target Server 134 returns an HTTP response with the requested data to EN2 126. In step 503, EN2 126 relays that same response to Service Gateway 120. In step 505, Service Gateway 120 forwards the HTTP request to Proxy Gateway 114. In step 507, Proxy Gateway 114 forwards the HTTP request to VPN Gateway 108 which in step 509 returns the data to User Device 102 through the established VPN tunnel. All of the returning communication happens transparently and no element of the chain is rerouting, reading or logging the data. In other words, there is no man in the middle rerouting. Depending on the type of connection protocol that Second Target Server 134 uses, the communication can be encrypted, for example if HTTPS protocol is used.

The embodiments herein may be combined in a variety of ways as a matter of design choice. Accordingly, the features and aspects herein are not intended to be limited to any particular embodiment. Furthermore, the embodiments can take the form of hardware, firmware, software, and/or combinations thereof. In one embodiment, such software includes but is not limited to firmware, resident software, microcode, etc. FIG. 6 illustrates a computing system 600 in which a computer readable medium 606 may provide instructions for performing any of the methods and processes disclosed herein.

Furthermore, some aspects of the embodiments herein can take the form of a computer program product accessible from the computer readable medium 606 to provide program code for use by or in connection with a computer or any instruction execution system. For the purposes of this description, the computer readable medium 606 can be any apparatus that can tangibly store the program code for use by or in connection with the instruction execution system, apparatus, or device, including the computing system 600.

The computer readable medium 606 can be any tangible electronic, magnetic, optical, electromagnetic, infrared, or semiconductor system (or apparatus or device). Some examples of a computer readable medium 606 include solid state memories, magnetic tapes, removable computer diskettes, random access memories (RAM), read-only memories (ROM), magnetic disks, and optical disks. Some examples of optical disks include read only compact disks (CD-ROM), read/write compact disks (CD-R/W), and digital versatile disks (DVD).

The computing system 600 can include one or more processors 602 coupled directly or indirectly to memory 608 through a system bus 810. The memory 608 can include local memory employed during actual execution of the program code, bulk storage, and/or cache memories, which provide temporary storage of at least some of the program code in order to reduce the number of times the code is retrieved from bulk storage during execution.

Input/output (I/O) devices 604 (including but not limited to keyboards, displays, pointing devices, I/O interfaces, etc.) can be coupled to the computing system 600 either directly or through intervening I/O controllers. Network adapters may also be coupled to the computing system 600 to enable the computing system 600 to couple to other data processing systems, such as through host systems interfaces 612, printers, and/or storage devices through intervening private or public networks. Modems, cable modems, and Ethernet cards are just examples of network adapter types.

The disclosure presents a method for transferring media over a VPN connection, the method comprising receiving, at a VPN server from a user device, a first request for connection to a first target; generating, at the VPN server, a session identification (ID) string for the first request; sending, from the VPN server to a proxy service provider (PSP), the first request, the session ID string; receiving, at the VPN server, a response to the first request from the PSP, fetched by a first exit node assigned to the first request; receiving, at the VPN server from the user device, a second request for connection to the first target or to a second target, different from the first target; assigning, at the VPN server, the session ID string to the second request; and sending, from the VPN server to the PSP, the second request and the session ID string, wherein the PSP assigns the first exit node to the session ID string for the second request.

The method wherein the session ID is created using a technique which enables creation of the same session ID based on the same input parameters and wherein the session ID is generated based on at least one of a User Network ID, a User Hardware ID, or a User Software Generated ID of the user device, with at least one of a Server Network ID, a Server Hardware ID, or a Server Software Generated ID of the VPN server. The method further comprising hashing, at the VPN server, the session ID string by a cryptographic algorithm.

The method for transferring media over a VPN connection, wherein sending the first request and the session ID string from the VPN server to the PSP comprises sending the first request and the session ID string from the VPN server to a proxy media server (PMS).

The method for transferring media over a VPN connection, wherein the PMS is configured to: read the session ID string; store the session ID string in a database; and send the first request and the session ID string to the PSP.

The method for transferring media over a VPN connection wherein, if the session ID is presented in a different protocol than PSP protocol, then the session ID is translated from a proxy protocol to the PSP protocol by the Proxy Media Server or the VPN server. The PSP protocol comprises at least one of IP in IP (Protocol 4): IP in IPv4/IPv6; SIT/IPv6 (Protocol 41): IPv6 in IPv4/IPv6; GRE (Protocol 47): Generic Routing Encapsulation; OpenVPN (UDP port 1194); SSTP (TCP port 443): Secure Socket Tunneling Protocol; IPSec (Protocol 50 and 51): Internet Protocol Security; L2TP (Protocol 115): Layer 2 Tunneling Protocol; VXLAN (UDP port 4789): Virtual Extensible Local Area Network; WireGuard; Proxy Protocol; or Proxy Protocol v2.

The method for transferring media over a VPN connection, wherein the session ID string remains unchanged at least till the user device remains connected to an initiated session of the VPN connection, remains active on the VPN connection, or the expiry of a pre-defined user activity timer.

The method further comprising assigning, by the VPN server, the session ID to a third request from the user device to a third target server, wherein the third request is subsequent to the second request and is in the same session as the first and the second requests.

The method for transferring media over a VPN connection further comprising: receiving, at the VPN server from the user device, the second request to the second target; detecting, at the VPN server, the session ID string; sending, from the VPN server, the second request and the session ID string to the PSP, wherein the PSP is configured to use the first exit node to implement the second request. The method for transferring media over a VPN connection, wherein the second request is associated with a different domain than a domain of the first request.

A disclose presents an apparatus for transferring media over a VPN connection, the apparatus comprising: at least one processor; and a memory communicably coupled to the at least one processor, the memory comprising computer executable instructions, which when executed using the at least one processor, performs a method comprising:

receiving, at a VPN server from a user device, a first request for connection to a first target;

generating, at the VPN server, a session identification (ID) string for the first request;

sending, from the VPN server to a proxy service provider (PSP), the first request, the session ID string;

receiving, at the VPN server, a response to the first request from the PSP, fetched by a first exit node assigned to the first request;

receiving, at the VPN server from the user device, a second request for connection to the first target or to a second target, different from the first target;

assigning, at the VPN server, the session ID string to the second request; and sending, from the VPN server to the PSP, the second request and the session ID string, wherein the PSP assigns the first exit node to the session ID string for the second request.

The apparatus wherein the session ID is generated based on at least one of a User Network ID, a User Hardware ID, or a User Software Generated ID of the user device, of the user device; or combination of one of a User Network ID, a User Hardware ID, or a User Software Generated ID of the user device with at least one of a Server Network ID, a Server Hardware ID, or a Server Software Generated ID of the VPN server.

The apparatus for transferring media over a VPN connection wherein sending the first request and the session ID string from the VPN server to the PSP comprises sending the first request and the session ID string from the VPN server to a proxy media server (PMS), wherein the PMS is configured to: read the session ID string; store the session ID string in a database; and send the first request and the session ID string to the PSP.

In the apparatus the session ID string remains unchanged at least till the user device remains connected to an initiated session of the VPN connection, remains active on the VPN connection, or expiry of a pre-defined user activity timer.

A disclose presents a non-transitory computer readable medium for transferring media over a VPN connection, the non-transitory computer readable medium comprising computer executable instructions, which, when executed by a computing device. Causes the computing device to perform a method comprising:

receiving, at a VPN server from a user device, a first request for connection to a first target;

generating, at the VPN server, a session identification (ID) string for the first request;

sending, from the VPN server to a proxy service provider (PSP), the first request, the session ID string;

receiving, at the VPN server, a response to the first request from the PSP, fetched by a first exit node assigned to the first request;

receiving, at the VPN server from the user device, a second request for connection to the first target or to a second target, different from the first target;

assigning, at the VPN server, the session ID string to the second request; and sending, from the VPN server to the PSP, the second request and the session ID string, wherein the PSP assigns the first exit node to the session ID string for the second request.

The non-transitory computer readable medium wherein the session ID is generated based on at least one of a User Network ID, a User Hardware ID, or a User Software Generated ID of the user device; or combination of one of a User Network ID, a User Hardware ID, or a User Software Generated ID of the user device with at least one of a Server Network ID, a Server Hardware ID, or a Server Software Generated ID of the VPN server.

The non-transitory computer readable medium wherein sending the first request and the session ID string from the VPN server to the PSP comprises sending the first request and the session ID string from the VPN server to a proxy media server (PMS), wherein the PMS is configured to:

read the session ID string;

store the session ID string in a database; and send the first request and the session ID string to the PSP.

The non-transitory computer readable medium wherein the session ID string remains unchanged at least till the user device remains connected to an initiated session of the VPN connection, remains active on the VPN connection, or expiry of a pre-defined user activity timer.

Although several embodiments have been described, one of ordinary skill in the art will appreciate that various modifications and changes can be made without departing from the scope of the embodiments detailed herein. Accordingly, the specification and figures are to be regarded in an illustrative rather than a restrictive sense, and all such modifications are intended to be included within the scope of the present teachings. The benefits, advantages, solutions to problems, and any element(s) that may cause any benefit, advantage, or solution to occur or become more pronounced are not to be construed as a critical, required, or essential feature or element of any or all the claims. The invention is defined solely by the appended claims including any amendments made during the pendency of this application and all equivalents of those claims as issued.

Moreover, in this document, relational terms such as first and second, and the like may be used solely to distinguish one entity or action from another entity or action without necessarily requiring or implying any actual such relationship or order between such entities or actions. The terms "comprises", "comprising", "has", "having", "includes", "including", "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", 'includes . . . a", "contains . . . a" does not, without additional constraints, preclude the existence of additional identical elements in the process, method, article, and/or apparatus that comprises, has, includes, and/or contains the element. The terms "a" and "an" are defined as one or more unless explicitly stated otherwise herein. The terms "approximately", "about" or any other version thereof, are defined as being close to as understood by one of ordinary skill in the art. A device or structure that is "configured" in a certain way is configured in at least that way, but may also be configured in ways that are not listed. For the indication of elements, a singular or plural form can be used, but it does not limit the scope of the disclosure and the same teaching can apply to multiple objects, even if in the current application an object is referred to in its singular form.

It will be appreciated that some embodiments describe the use of one or more generic or specialized databases (such as "Exit Nodes Database", or similar), that contains a collection of information that is organized so that it can be easily accessed, managed and updated. Computer databases typically contain aggregations of data records or files, in the current case, databases usually store different information and statistics about the proxies or exit nodes, information about utilization threshold of the exit node provider. Such databases can also contain information about the users, requests performed, networks used, exit nodes used, types of exit nodes requested and similar data. Databases are structured to facilitate the storage, retrieval, modification, and deletion of data in conjunction with various data-processing operations.

The Disclosure is provided to allow the reader to quickly ascertain the nature of the technical disclosure. It is submitted with the understanding that it will not be used to interpret or limit the scope or meaning of the claims. In addition, in the foregoing Detailed Description, it is demonstrated that multiple features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment.

The invention claimed is:

1. A method for transferring media over a VPN connection, the method comprising:
   receiving, at a VPN server from a user device, a first request for connection to a first target;
   generating, at the VPN server, a session identification (ID) string for the first request;
   sending, from the VPN server to a proxy service provider (PSP), the first request and the session ID string;
   receiving, at the VPN server, a response to the first request from the PSP, fetched by a first exit node assigned to the first request;
   receiving, at the VPN server from the user device, a second request for connection to the first target or to a second target, different from the first target;
   assigning, at the VPN server, the session ID string to the second request; and
   sending, from the VPN server to the PSP, the second request and the session ID string, wherein the PSP assigns the first exit node to the session ID string for the second request.

2. The method of claim 1, wherein the session ID is created using a technique which enables creation of the same session ID based on the same input parameters.

3. The method of claim 2, wherein the session ID is generated based on at least one of a User Network ID, a User Hardware ID, or a User Software Generated ID of the user device;
   or combination of one of a User Network ID, a User Hardware ID, or a User Software Generated ID of the user device with at least one of a Server Network ID, a Server Hardware ID, or a Server Software Generated ID of the VPN server.

4. The method of claim 3, further comprising hashing, at the VPN server, the session ID string by a cryptographic algorithm.

5. The method of claim 1, wherein sending the first request and the session ID string from the VPN server to the PSP comprises sending the first request and the session ID string from the VPN server to a proxy media server (PMS).

6. The method of claim 5, wherein the PMS is configured to:
   read the session ID string;
   store the session ID string in a database; and
   send the first request and the session ID string to the PSP.

7. The method of claim 5 wherein, if the session ID is presented in a different protocol than PSP protocol, then the session ID is translated from a proxy protocol to the PSP protocol by the Proxy Media Server or the VPN server.

8. The method of claim 7, wherein the PSP protocol comprises at least one of IP in IP (Protocol 4): IP in IPv4/IPv6; SIT/IPv6 (Protocol 41): IPv6 in IPv4/IPv6; GRE (Protocol 47): Generic Routing Encapsulation; OpenVPN (UDP port 1194); SSTP (TCP port 443): Secure Socket Tunneling Protocol; IPSec (Protocol 50 and 51): Internet Protocol Security; L2TP (Protocol 115): Layer 2 Tunneling Protocol; VXLAN (UDP port 4789): Virtual Extensible Local Area Network; WireGuard; Proxy Protocol; or Proxy Protocol v2.

9. The method of claim 1, wherein the session ID string remains unchanged at least till the user device remains connected to an initiated session of the VPN connection, remains active on the VPN connection, or expiry of a pre-defined user activity timer.

10. The method of claim 1, further comprising assigning, by the VPN server, the session ID to a third request from the user device to a third target server, wherein the third request is subsequent to the second request and in the same session as the first and the second requests.

11. The method of claim 1, further comprising:
   receiving, at the VPN server from the user device, the second request to the second target;
   detecting, at the VPN server, the session ID string;
   sending, from the VPN server, the second request and the session ID string to the PSP, wherein the PSP is configured to use the first exit node to implement the second request.

12. The method of claim 1, wherein the second request is associated with a different domain than a domain of the first request.

13. An apparatus for transferring media over a VPN connection, the apparatus comprising:
   at least one processor; and
   a memory communicably coupled to the at least one processor, the memory comprising computer executable instructions, which when executed using the at least one processor, performs a method comprising:
   receiving, at a VPN server from a user device, a first request for connection to a first target;
   generating, at the VPN server, a session identification (ID) string for the first request;
   sending, from the VPN server to a proxy service provider (PSP), the first request and the session ID string;
   receiving, at the VPN server, a response to the first request from the PSP, fetched by a first exit node assigned to the first request;
   receiving, at the VPN server from the user device, a second request for connection to the first target or to a second target, different from the first target;
   assigning, at the VPN server, the session ID string to the second request; and
   sending, from the VPN server to the PSP, the second request and the session ID string, wherein the PSP assigns the first exit node to the session ID string for the second request.

14. The apparatus of claim 13, wherein the session ID is generated based on at least one of a User Network ID, a User Hardware ID, or a User Software Generated ID of the user device;
   or combination of one of a User Network ID, a User Hardware ID, or a User Software Generated ID of the user device with at least one of a Server Network ID, a Server Hardware ID, or a Server Software Generated ID of the VPN server.

15. The apparatus of claim 13, wherein sending the first request and the session ID string from the VPN server to the PSP comprises sending the first request and the session ID string from the VPN server to a proxy media server (PMS), wherein the PMS is configured to:
   read the session ID string;
   store the session ID string in a database; and
   send the first request and the session ID string to the PSP.

16. The apparatus of claim 13, wherein the session ID string remains unchanged at least till the user device remains connected to an initiated session of the VPN connection, remains active on the VPN connection, or expiry of a pre-defined user activity timer.

17. A non-transitory computer readable medium for transferring media over a VPN connection, the non-transitory computer readable medium comprising computer executable instructions, which, when executed by
- a computing device, causes the computing device to perform a method comprising:
- receiving, at a VPN server from a user device, a first request for connection to a first target;
- generating, at the VPN server, a session identification (ID) string for the first request;
- sending, from the VPN server to a proxy service provider (PSP), the first request and the session ID string;
- receiving, at the VPN server, a response to the first request from the PSP, fetched by a first exit node assigned to the first request;
- receiving, at the VPN server from the user device, a second request for connection to the first target or to a second target, different from the first target;
- assigning, at the VPN server, the session ID string to the second request; and
- sending, from the VPN server to the PSP, the second request and the session ID string,
- wherein the PSP assigns the first exit node to the session ID string for the second request.

18. The non-transitory computer readable medium of claim 17, wherein the session ID is generated based on at least one of a User Network ID, a User Hardware ID, or a User Software Generated ID of the user device;
- or combination of one of a User Network ID, a User Hardware ID, or a User Software Generated ID of the user device with at least one of a Server Network ID, a Server Hardware ID, or a Server Software Generated ID of the VPN server.

19. The non-transitory computer readable medium of claim 17, wherein sending the first request and the session ID string from the VPN server to the PSP comprises sending the first request and the session ID string from the VPN server to a proxy media server (PMS), wherein the PMS is configured to:
- read the session ID string;
- store the session ID string in a database; and
- send the first request and the session ID string to the PSP.

20. The non-transitory computer readable medium of claim 17, wherein the session ID string remains unchanged at least till the user device remains connected to an initiated session of the VPN connection, remains active on the VPN connection, or expiry of a pre-defined user activity timer.

* * * * *